US00RE50273E

(19) United States
(12) Reissued Patent
Mack

(10) Patent Number: US RE50,273 E
(45) Date of Reissued Patent: Jan. 14, 2025

(54) METHOD AND APPARATUS FOR DEFINING COMMON ENTITY RELATIONSHIPS

(71) Applicant: Robert Mack, Hillsborough, NJ (US)

(72) Inventor: Robert Mack, Hillsborough, NJ (US)

(21) Appl. No.: 17/069,625

(22) Filed: Oct. 13, 2020

Related U.S. Patent Documents

Reissue of:

(64) Patent No.: 8,874,619
Issued: Oct. 28, 2014
Appl. No.: 13/746,083
Filed: Jan. 21, 2013

U.S. Applications:

(63) Continuation of application No. 15/289,305, filed on Oct. 10, 2016, now Pat. No. Re. 48,312, which is an application for the reissue of Pat. No. 8,874,619, which is a continuation-in-part of application No. 13/152,683, filed on Jun. 3, 2011, now Pat. No. 8,554,801.

(51) Int. Cl.

| | |
|---|---|
| ***G06F 17/00*** | (2019.01) |
| ***G06F 16/17*** | (2019.01) |
| ***G06F 16/21*** | (2019.01) |
| ***G06F 17/30*** | (2006.01) |

(52) U.S. Cl.
CPC ..... *G06F 16/17* (2019.01); *G06F 16/212* (2019.01)

(58) Field of Classification Search
CPC ..... G06F 17/30129; G06F 17/30294
See application file for complete search history.

(56) References Cited

U.S. PATENT DOCUMENTS

| | | | | |
|---|---|---|---|---|
| 5,369,761 | A | 11/1994 | Conley | |
| 5,907,846 | A | 5/1999 | Berner et al. | 707/103 R |
| 6,212,530 | B1 * | 4/2001 | Kadlec | |
| 6,438,591 | B1 * | 8/2002 | Fehskens et al. | 709/223 |
| 6,453,325 | B1 * | 9/2002 | Cabrera et al. | |
| 6,460,043 | B1 | 10/2002 | Tabbara | |
| 6,529,921 | B1 * | 3/2003 | Berkowitz et al. | 715/201 |
| 6,836,777 | B2 * | 12/2004 | Holle | |
| 6,847,979 | B2 | 1/2005 | Allemang et al. | 707/102 |
| 7,024,414 | B2 * | 4/2006 | Sah et al. | |
| 7,024,417 | B1 | 4/2006 | Russakovsky et al. | 707/101 |
| 7,546,226 | B1 * | 6/2009 | Yeh | G06F 16/288 703/2 |
| 7,603,378 | B2 * | 10/2009 | Ivanova | |
| 7,617,136 | B1 * | 11/2009 | Lessing et al. | 705/28 |
| 7,676,493 | B2 * | 3/2010 | Pizzo et al. | 707/796 |
| 2002/0103793 | A1 * | 8/2002 | Koller et al. | 707/3 |
| 2003/0149934 | A1 * | 8/2003 | Worden | 715/513 |
| 2004/0181440 | A1 | 9/2004 | Yeh | |
| 2005/0004902 | A1 | 1/2005 | Torigoe et al. | 707/3 |
| 2005/0160091 | A1 | 7/2005 | Daniel | |
| 2005/0240621 | A1 * | 10/2005 | Robertson et al. | 707/102 |
| 2006/0173873 | A1 * | 8/2006 | Prompt et al. | 707/100 |

(Continued)

OTHER PUBLICATIONS

"Column-Stores vs. Row-Stores: How Different Are They Really?", Abadi, Madden, Hachem, p. 967-980; copyright 2008.

(Continued)

*Primary Examiner* — Angela M Lie
(74) *Attorney, Agent, or Firm* — Walter J. Tencza, Jr.

(57) ABSTRACT

A method, an apparatus, and a system for configuring, designing, and/or implementing common metadata and common data is detailed as a new type of data relationship, within and between databases.

24 Claims, 9 Drawing Sheets

(56) References Cited

U.S. PATENT DOCUMENTS

| | | | | |
|---|---|---|---|---|
| 2006/0179055 | A1* | 8/2006 | Grinsfelder et al. | 707/6 |
| 2007/0255730 | A1 | 11/2007 | Mack | 707/100 |
| 2007/0266041 | A1 | 11/2007 | Beckman | |
| 2011/0178974 | A1 | 7/2011 | Sayal | |
| 2011/0231449 | A1 | 9/2011 | Ashley | |

OTHER PUBLICATIONS

"Database Design and Creation", Chapter 3, pp. 51-89, Dewson, Robin, Beginning SQL Server 2008 for Developers: From Novice to Professional, Apress, Berkeley, CA, (c) 2008.

"An object-oriented implementation of an entirely relationship model"; Hock Chuan Chan, Danny C.C. Poo, Cheng Peng Woon; The Journal of Systems and Software 41 (19980) 117-125.

"Improving Database Design Through the Analysis of Relationships", Dey, pp. 453-486; accepted Jul. 1999; ACM Transactions on Database Systems, vol. 24, No. 4, Dec. 1999.

Dey, Debabrata, et al., "Improving database Design through the Analysis of Relationships", ACM Transactions on Database Systems, vol. 24, No. 4, Dec. 1999, pp. 453-486.*

Chan, Hock Chuan, et al., "An object-oriented implementation of an entity relationship model", The Journal of Systems and Software, vol. 41, Elsevier Science, Inc., © 1998, pp. 117-125.*

Abadi, Daniel J., et al., "Column-Stores vs. Row-Stores: How Different Are They Really?", SIGMOD '08, Vancouver, BC, Canada, Jun. 9-12, 2008, pp. 967-980.*

Dewson, Robin, Beginning SQL Server 2008 for Developers: From Novice to Professional, "Chapter 3: Database Design and Creation", Apress, Berkeley, CA, © 2008, pp. 51-89.* http://www.datamodel.org/NormalizationRules.html, Mar. 4, 2009.

Quigley, Edward; Debons, Anthony Interrogative Theory Information and Knowledge, 1999.

* cited by examiner

Fig. 4
(Prior Art)

400

402

410 412 414

| Database Action | Country Table (Parent Table) | State Table (Child Table) |
|---|---|---|
| **Create** | Unrestricted data record creation | Foreign key index data value must exist in parent table's unique index |
| **Update** | Do not allow changes to unique index data values if one or more child data records is related | Restrict foreign key data values to the values currently in the parent table |
| **Delete** | Do not delete parent data records that have related child data records | Unrestricted data record deletion |

416

418

420

Fig. 7

700

702

704 706 708

| Database Action | Master Database: Country Table (Master Table) | Database n: Country Table (Dependent Tables) |
|---|---|---|
| **Create** | Unrestricted data record creation | Data Record must exist in master table |
| **Update** | Do not allow changes to common unique index data values if a dependent data record exists | Restrict the foreign key index data values to the data values currently in the master table |
| **Delete** | Data records may not be deleted if referenced by a dependent data record | Unrestricted data record deletions |

710 712 714

Fig. 8

800

802

| Database Action (804) | 1st Country Table (Peer Table) (806) | 2nd Country Table (Peer Table) (808) |
|---|---|---|
| **Create** | Unrestricted data record creation from common set of master data | Unrestricted data record creation from common set of master data (810) |
| **Update** | Unrestricted data record updates from common set of master data | Unrestricted data record updates from common set of master data (812) |
| **Delete** | Unrestricted data record deletions | Unrestricted data record deletions (814) |

METHOD AND APPARATUS FOR DEFINING COMMON ENTITY RELATIONSHIPS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION(S)

The present application is a continuation in part of and claims the priority of U.S. patent application Ser. No. 13/152,683, filed on Jun. 3, 2011 titled "METHOD AND APPARATUS FOR CONVERTING HETEROGENEOUS DATABASES INTO STANDARDIZED HOMOGENEOUS DATABASES", inventor and applicant Robert Mack, such that Jun. 3, 2011 is the earliest priority date for the present application.

*The present application is a continuation reissue patent application which claims the priority of parent reissue patent application Ser. No. 15,289,305, filed on Oct. 10, 2016, which is a reissue patent application of U.S. Pat. No. 8,874,619, which claims the priority of U.S. patent application Ser. No. 13/746,083, filed on Jan. 21, 2013, which claims the priority of and is a continuation in part of patent application Ser. No. 13/152,683, filed on Jun. 3, 2011, such that Jun. 3, 2011 is the earliest priority date for the present continuation reissue patent application; and wherein all of the above U.S. patent applications and U.S. patents are hereby fully incorporated herein in their entirety by reference thereto and are claimed for priority benefit by this present continuation reissue patent application.*

FIELD OF THE INVENTION

This invention relates to improved methods and apparatus concerning the design and development of data models and their associated databases.

BACKGROUND OF THE INVENTION

In 1976, the concept of entity-relationship diagramming and data modeling was developed. Data entities and data entity relationships are the major components of prior art entity-relationship diagrams. One function of data models is to design database structures such as database tables, database table columns, and database table indexes.

Data entity relationships are the only prior art data relationships recognized by this methodology. These data entity relationships are used to link data entities together to form designed data access paths between the resultant instantiated database tables. These data access paths are used to join data from two or more database tables to form a coherent set of extended data records. These data entity relationships of data models and their associated database instantiated data access paths are essential to the fundamental function of all relational databases.

SUMMARY OF THE INVENTION

One or more embodiments of the present invention includes a method of enhancing data models to declare common data attributes that function as common unique keys in multiple data entities in a computer memory. Common entity relationships, which are a new type of data entity relationship, may also be added to the data model to designate these multiple data entities, which contain a common unique key, as common data entities. A set of common data values may also be used to populate the common database tables that are database instantiated from these related common data entities. A computer processor may be programmed by computer software stored in computer memory, to define common data attributes, automatically or in response to a computer user's inputs through a computer interactive device, such as a computer keyboard, a touch screen monitor, or a computer mouse.

A method in accordance with one or more embodiments of the present invention, may further include the declaration of multiple databases within a single data model, in a computer memory, for the purposes of designing multiple databases within this single data model, in a computer memory, as implemented for example by a computer processor programmed by computer software, stored in a computer memory.

BRIEF DESCRIPTION OF THE DRAWINGS

FIG. 4 depicts a spreadsheet of prior art referential integrity rules for a database foreign key constraint such as that shown in FIG. 3. These referential integrity rules may be declared for each data entity relationship of an entity-relationship diagram such as the data entity relationship shown in FIG. 2;

FIG. 7 depicts a spreadsheet of common index integrity rules for common index master constraints, that can be displayed on a display device of the apparatus of FIG. 1 and/or stored in a computer memory of the apparatus of FIG.

Figure 1:
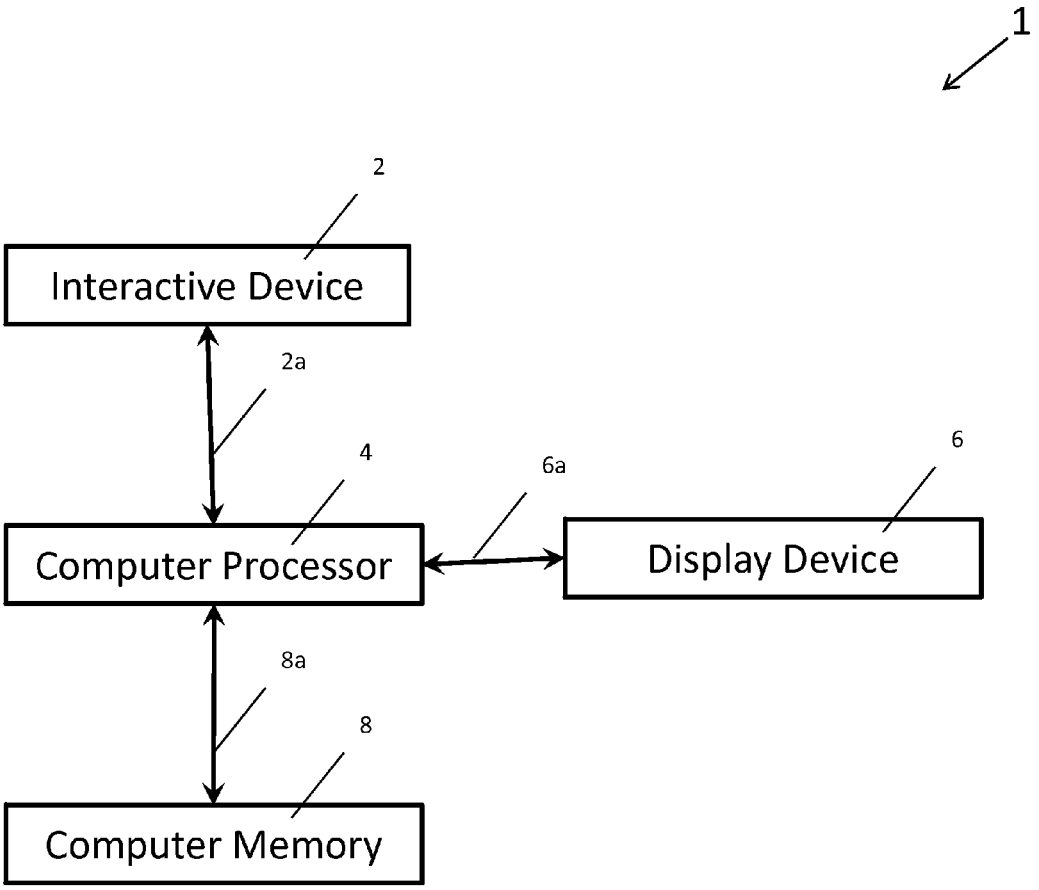
FIG. 1 shows a diagram of an apparatus in accordance with an embodiment of the present invention.
Figure 5:
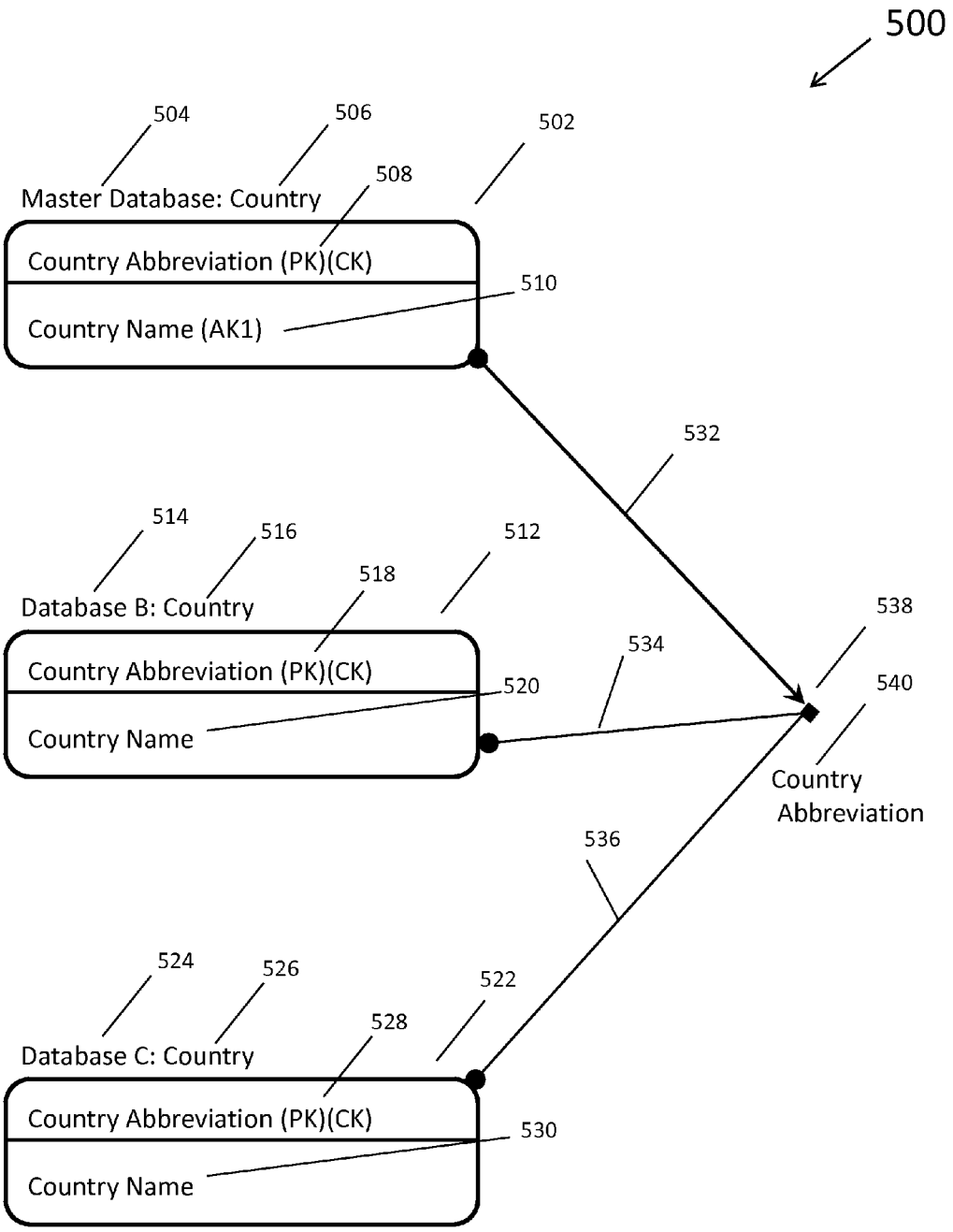
FIG. 5 depicts a data architecture diagram that can be displayed on a display device of the apparatus of FIG. 1 and/or stored in a computer memory of the apparatus of FIG. 1; wherein this data architecture diagram contains three data entities wherein each data entity contains the same primary key data attributes. These three data entities, that share a common unique key, are denoted as a set of common data entities that are related by a common entity relationship set.
Figure 6:
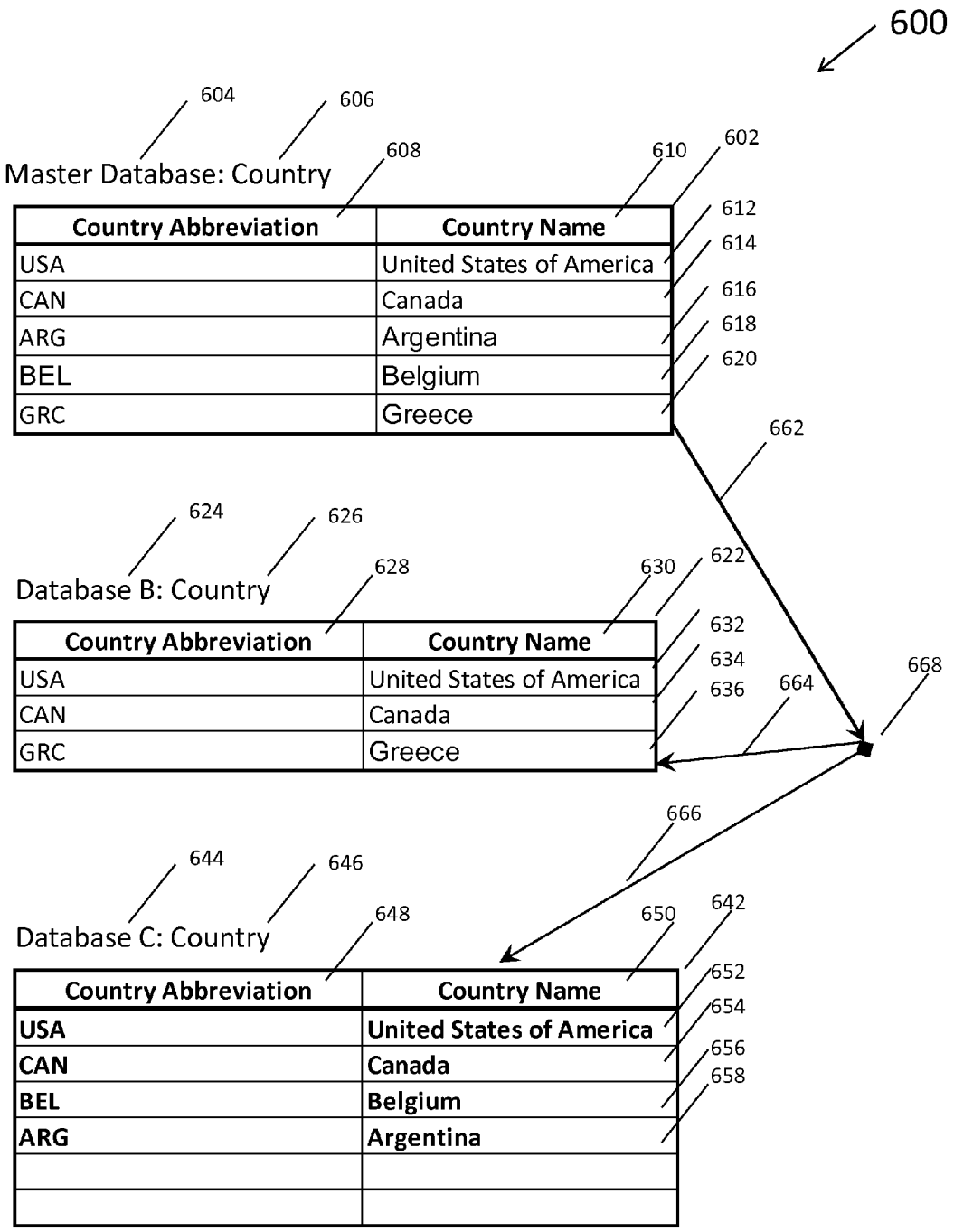
FIG. 6 depicts data architecture of three database tables that can be displayed on a display device of the apparatus of FIG. 1 and/or stored in a computer memory of the apparatus of FIG. 1; wherein each database table has a common unique index, declared as the primary key index for their respective database tables. Each of these three database tables, which share a common unique index, are denoted as a set of common database tables that share a common unique index set.
Figure 9:
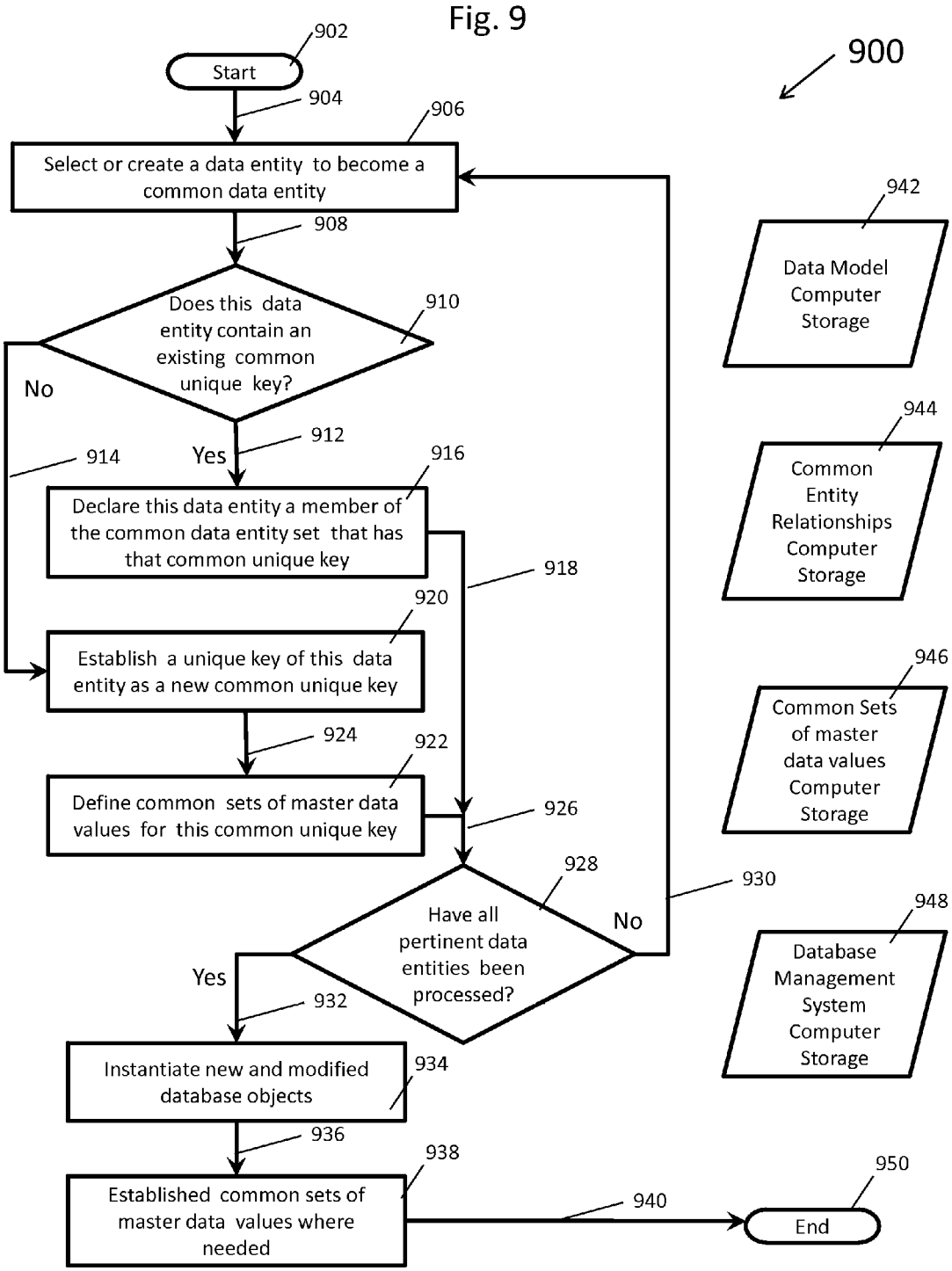

1; where the common index integrity rules are declared for each common entity master relationship;

FIG. 8 depicts a spreadsheet of common index integrity rules for common unique indexes, that can be displayed on a display device of the apparatus of FIG. 1 and/or stored in a computer memory of the apparatus of FIG. 1; where the common index integrity rules are declared for each common entity relationship; and FIG. 9 depicts a flow chart for a method of declaring common data entity sets and common entity relationship sets, in computer memory of the apparatus of FIG. 1, such as depicted in FIG. 5 and for database instantiation in computer memory of the apparatus of FIG. 1 of the common database table sets and the common unique index sets as depicted in FIG. 6.

DETAILED DESCRIPTION OF THE DRAWINGS

In the present application the following terms have the following definitions:

Alternate key—In an entity-relationship diagram (ERD), a data entity's alternate key is a unique key, stored in one or more computer memories, such as computer memory 8 in FIG. 1, that is declared by the computer user using a data modeling program in the entity-relationship diagram as an alternate method of selecting unique data records from a resultant database table by the database management system in one or more computer memories. In FIG. 1, the computer memory 8 may actually include one or more computer memories. A database table's alternate key is a unique index placed the database table in one or more computer memories by a database management system implemented by a computer processor, such as computer processor 4 in FIG. 1 and used to select data records from the database table.

Common database table—A common database table is a database table stored in one or more computer memories by the database management system that contains a common unique index that is populated in one or more computer memories by the database management system with data values from a common set of master data values stored in one or more computer memories.

Common database table set—A common database table set is a group of common database tables stored in one or more computer memories by the database management system that share a common unique index where the common unique indexes are each populated in one or more computer memories by the database management system from a common set of master data values stored in one or more computer memories.

Common database table master—A common database table master is a computer user selected common database table from a common database table set in one or more computer memories that is populated in one or more computer memories by the database management system with the common set of master data values that is used as the source of data values for the other common database tables of that common database table set in one or more computer memories.

Common data entity—A common data entity is a data entity stored in one or more computer memories using a data modeling program that contains a unique key that has been declared by the computer user to be a common unique key. When the common data entity undergoes database instantiation in one or more computer memories using the database management system, the result is a common database table in one or more computer memories.

Common data entity set—A common data entity set is a group of data entities defined using a data modeling program in one or more computer memories that share a common unique key where the common unique key of each common data entity each contain the same grouping of data attributes as defined by the computer user. In addition, the common unique key is declared to have a common set of master data values by the computer user using a data modeling program.

Common entity relationship—A common entity relationship is a peer-to-peer type of entity relationship, defined by the computer user using a data modeling program in one or more computer memories, wherein each common entity relationship is associated with a common data entity that includes a declared common unique key as defined within the data model using a data modeling program, where the common unique key exists in the common data entity prior to adding the common entity relationship.

Common entity relationship set—A common entity relationship set is a collection of common entity relationships, defined by a computer user using a data modeling program stored in one or more computer memories, wherein each common entity relationship is defined using the same common unique key of a common data entity.

Common entity master relationship—A common entity master relationship is a single common entity relationship from a common entity relationship set, selected by a computer user executing a data modeling program, wherein the common entity master relationship denotes the common data entity selected, in one or more computer memories, as the source of the common set of master data values.

Common index integrity rules—Common index integrity rules are defined in a data model and associated with each common entity relationship. These common index integrity rules define restrictions associated with creating, updating, and deleting data records from a common set of master data values in related common database tables from a single common database table set.

Common index master constraint—A common index master constraint is a set of common unique index integrity restrictions, stored in one or more computer memories, used to enforce the common index integrity rules, also stored in one or more computer memories, between the common database table master and the other common database tables of the common database table set. The common database table master is populated with the common set of master data values in one or more computer memories by the database management system. In at least one embodiment of the present invention, the other common database tables of the common database table set will be populated with the data values from the common database table master using the database management system in one or more computer memories.

Common set of master data values—A common set of master data values is a set of data values, stored in one or more computer memories, used to populate multiple common database tables by one or more database management system, and to enforce common index integrity rules between common database tables of the common database table set, wherein the common index integrity rules are stored in one or more computer memories and are enforced by the one or more database management system in one or more computer memories.

Common unique index—A common unique index is a database table unique index, maintained by the database management system and stored in one or more computer memories, wherein a common unique index is common to a common database table set, which is designed to uniquely identify each data record of a common database table from that common database table set. A common unique index is database instantiated using the database management system from a common unique key that is defined in a data model or a data architecture diagram by a computer user using a data modeling program, wherein the data model or the data architecture diagram is stored in one or more computer memories.

Common unique index set—A common unique index set is a group of related common unique indexes as defined by a computer user using a data modeling program and stored in one or more computer memories, wherein each common unique index is associated with a common database table from the same defined common database table set in one or more computer memories by the database management system.

Common unique key—A common unique key is a unique key declared by a computer user using a data modeling program for a set of data attributes contained within a common data entity stored in one or more computer memories. Within a data modeling program, each data entity that contains a common unique key becomes a common data entity in one or more computer memories in at least one embodiment of the present invention. Within a data modeling program executing on a computer processor such as computer processor 4 of FIG. 1, each common data entity that contains the same common unique key becomes a part of the same common data entity set stored in computer memory 8 as programmed on computer processor 4. To assure common unique index integrity within a common data entity set, a common set of master data values is declared by a computer user using a data modeling program in one or more computer memories for each common unique key.

Data architecture—A data architecture, for the purposes of the present patent application, is defined as a group of databases stored in one or more computer memories by one or more database management systems that share at least one common unique index set stored in one or more computer memories and at least one common database table set stored in one or more computer memories by one or more database management systems. In at least one embodiment of the present invention, a data architecture is database instantiation in one or more computer memories from a data architecture diagram stored in one or more computer memories using a data modeling program.

Data architecture diagram—A data architecture diagram, for the purposes of the present patent application, is an entity-relationship diagram or a group of entity-relationship diagrams stored in one or more computer memories using a data modeling program, wherein the data architecture diagram contains multiple data model databases stored in one or more computer memories. A data architecture diagram would normally include one or more common data entity sets and one or more common entity relationship sets stored in one or more computer memories and defined by a computer user using a data modeling program.

Database—A database is generally a grouping of data values typically stored in a computer memory and organized for convenient data value access by a database management system. More specific to the present patent application, a database is a defined data structure, generally stored in a computer memory, comprised of database tables, common database tables, database columns, database indexes, common unique indexes, foreign key constraints, common index master constraints and other database objects defined using a computer-based database management system.

Database management system—A database management system is a computer software application or software program stored in one or more computer memories, such as one or more of computer memory 8, and executed by a computer processor such as processor 4 of FIG. 1 for maintaining database objects, such as common database tables, database table indexes, and foreign key constraints as well as database data values that are populated into the database tables.

Database access path—A database access path is a designed linkage between two database tables where the set of data records from a first database table may be joined to the set of data records of a second database table to form a single concatenated set of data records, in one or more computer memories using the database management system. A joining the first set of data records to the second set of data records is based upon common data values in each set of data record. Each database access paths is database instantiated, in one or more computer memories using the database management system, from a single data entity relationship or a single common entity relationship of a data model. The joined sets of data records are formed into a single result set of metadata and data values that can be displayed on the display device 6 of the apparatus 1 of FIG. 1 or stored in a computer memory 8 of the apparatus 1 of FIG. 1.

Database index—A database index is a type of database object associated to a database table stored in computer memory using a database management system. A database index may be comprised of a single database table column of data values or be comprised of multiple database table columns of data values from the same database table. A database index may be configured to be a unique database index in the sense that the database index uses a key data value only once per database table, or designed as a non-unique database index, which may repeat key data values in that database table. The database management system is used to maintain the integrity of all database indexes which are stored in one or more computer memories. Database indexes are used to maintain the data value integrity of the database table data records as well as to aid in the rapid retrieval of specific data records from an indexed database table.

Database instantiation—The process of database instantiation is used to construct database objects, in one or more computer memories using a database management system that are available within a database through use of, for example, interactive device 2 and computer processor 4 shown in FIG. 1 to a database user. These database objects are created, maintained and deleted by a typically very complex computer software program, which may be executed by computer processor 4 and stored in computer memory 8, referred to as a database management system. A database management system is a computer program that executes on a computer or computer processor and that may be used to support multiple databases on one or more computers or computer processors. A database created under a database management system is stored in computer memory, such as computer memory 8. This database instantiation process is often controlled by another computer software program such as a data modeling program. Once a data model ("data model" is defined later) has been developed within the data modeling computer software, that data model is forward engineered. This process of forward engineering, which may be programmed on a computer program, instructs the database management system to construct these database objects such as database tables, database table indexes, and database table constraints. The process of database instantiation converts the data model objects and metadata into database objects, in one or more computer memories, such as computer memory 8. Each data entity of the data model is converted into a database table, which is stored in computer memory, such as in computer memory 8 shown in FIG. 1, where each data attribute of the data model becomes a column within a database table stored in computer memory. The metadata associated with each data attribute of the data model are used to define the data types for each database column, as well as the column's data lengths, the column's precision, and whether the column must be populated with data for each data record. The data model keys such as primary keys, alternate keys, and foreign keys, become database table unique and non-unique indexes.

Database table—A database table is a database object used to store sets of data values, in one or more computer memories. Each set of data values represents a horizontal row of the database table often referred to as a database table's data record. Each data value of these data records is represented as a labeled vertical column of the database table. Each data value, of a specific data record, may be addressed, in one or more computer memories by using the label of said vertical column.

Data entity—A data entity is a basic component of an entity-relationship diagram that can be displayed on the display device 6 of the apparatus 1 of FIG. 1 and that is stored in a computer memory such as the computer memory 8 of the apparatus 1 shown in FIG. 1. Each data entity of the entity-relationship diagram will be given a name to uniquely identify that data entity from all other data entities of the entity-relationship diagram. When the database is formed from the entity-relationship diagram, each data entity typically is instantiated in the database as a single database table in computer memory. In addition, a data entity includes a list of data attributes, which, when the database is formed, becomes the list of database columns. Each data entity generally has a primary key declared based upon one or more of the data attributes listed for that data entity. Each data entity may also have alternate keys declared also based upon one or more of the data attributes listed for that data entity. When the database is formed from the entity-relationship diagram, the primary key and the alternate keys are typically instantiated as unique database table indexes in computer memory.

Data entity, supertype and subtype groups—A supertype and subtype group of data entities are a group of three or more closely related data entities from a single overall topic. In a supertype and subtype group of data entities, only one data entity of the group is the supertype data entity and the rest of the data entities of the group are the subtype data entities. The overall topic of the group of data entities is shared among them. For example, the overall topic for the supertype and for the subtype data entities could be employees. The supertype data entity would only contain data attributes that are common to all employees. The sub type data entities would be established for each subtype of employee such as hourly employees and salaried employees. The hourly employee subtype data entity contains data attributes that are specific only to hourly employees. The salary employee subtype data entity contains data attributes that are specific only to salaried employees. The supertype data entity has a single entity relationship to each of the subtype data entities where the supertype data entity is the parent data entity that contributes its primary key data attributes. Each of the subtype data entities are child data entities that inherit the primary key data attributes from the parent data entity as the foreign primary key data attributes of each subtype data entity.

Data entity relationship—A data entity relationship is a connector or link, which is stored in one or more computer memories, such as in computer memory 8, between one or two data entities in a data entity-relationship diagram. A data entity linking a data entity with itself is often referred to as a recursive data entity relationship. A data entity relationship provides a means of joining data attributes of one data entity with data attributes of another data entity. The data entity relationships are depicted graphically in entity-relationship diagrams as lines that begin attached to a first data entity and end with a filled circle on the dependent data entity. A data entity relationship causes the data modeling program to duplicate the primary key data attributes or to duplicate an alternate key data attribute from a first data entity into the data entity that is dependent on the first data entity. These duplicated key data attributes do not exist in the dependent data entity prior to adding the data entity relationship. The computer processor 4 may be programmed by data modeling computer software to permit a user via interactive device 2 to make relationships between data entities. The user, via interactive device 2, may select which of a first data entity's key data attributes will be duplicated by the data modeling computer software. These duplicated key data attributes are referred to as a foreign key data attributes in the dependent data entity. Upon database instantiation, a data entity relationship from the entity-relationship diagram is instantiated as a foreign key constraint, in one or more computer memories, such as computer memory 8.

Data model—A data model is a computer implemented repository of metadata, including entity-relationship diagrams, which may contain data model databases, data entities, common data entities, data attributes, common entity relationships, and data entity relationships that can be displayed on the display device 6 of the apparatus 1 of FIG. 1 or stored in the computer memory 8 of the apparatus 1 of FIG. 1. When the data model is database instantiated, each common data entity usually becomes a common database table, each data entity usually becomes a database table, while the data attributes become database table columns and the data entity relationships become foreign key constraints while the common unique keys become common unique indexes.

Data model database—A data model database, for the purposes of this patent, is a data model object that is used to partition a data model into segments where each data model database segment of the data model may be database instantiated into a physical database within the database management system. Each data model database will contain data model objects such as data entities, common data entities, common entity relationships and data entity relationships. Only the common entity relationships may cross from one data model database to another.

Data modeling program—A data modeling program is a computer program, executing on a computer processor such as computer processor 4 in FIG. 1, wherein the data modeling program is used to define and maintain data models. In addition, a data modeling program is also used to database instantiate a data model into one or more databases using one or more database management systems. In at least one embodiment of the present invention, a data architecture diagram may be database instantiated into a data architecture using one or more database management systems executing on one or more computers, wherein the data architecture is stored in one or more computer memories such as computer memory 8.

Data record—A data record is a single row of data values in a database table stored in a computer memory, such as computer memory 8. Each data record will usually include a primary key value for uniquely identifying that data record. In addition, a data record may include alternate key values to provide alternative methods for finding unique data records in a computer memory, such as computer memory 8 in FIG. 1. A data record may also include foreign key values or common index sets to allow linking of data records from multiple database tables.

Data value—A data value is an alphanumeric string stored in a specific location in a computer memory such as a named data field. For example, a data value may be stored in a data field of a data entry form in a computer memory or in a specific cell of a spreadsheet or in a specific data column of a specific data record of a database table in computer memory. The interpretation of the actual value of the alphanumeric string is dependent upon the data type of the data field. For example, if the data type of a data field is numeric, only valid numeric values will be accepted into the data field.

Entity-Relationship diagram—An entity-relationship diagram (ERD) is a graphical depiction of a database design that includes data entities, common data entities, common entity relationships, and data entity relationships that can be displayed on the display device 6 of the apparatus 1 of FIG. 1 or stored in a computer memory 8 of the apparatus 1 of FIG. 1. The depicted data entities and common data entities represent potential database tables to be database instantiated. The depicted data entity relationships represent potential foreign key constraints to be database instantiated into the same database and used to maintain referential integrity between the instantiated database tables. A common entity relationship represents potential common unique indexes that are populated from a common set of master data values used to maintain referential integrity between common database tables. An ERD, in at least one embodiment of the present invention, is always stored within a data model along with other metadata required to instantiate a database.

Foreign key—A foreign key provides a link, via a data entity relationship between two data entities in an entity-relationship diagram that is stored in computer memory. The data attributes from the primary key or a selected alternate key of a first data entity are duplicated into a second data entity which is now dependent upon the first data entity. These duplicated data attributes are referred to as foreign key data attributes. This link or data entity relationship, when database instantiated, instantiates a foreign key constraint that enforces referential integrity between the two database tables that result from the first data entity and from the dependent second data entity. Foreign key data attributes, when database instantiated, become foreign key database columns.

Foreign key constraint—A foreign key constraint is declared in a database management system as a means of implementing and maintaining database referential integrity between two data sets each of which is most often contained within two different database tables. A foreign key constraint is normally designed in an entity-relationship diagram as a data entity relationship usually between two data entities. The first data entity, often referred to as the parent data entity, contributes one or more key data attributes to the second data entity, which is often referred to as the dependent data entity. In the parent data entity, a unique key, such as the primary key or an alternate key, has its data attributes copied into the dependent data entity's set of data attributes. These copied data attributes are referred to as the foreign key data attributes in the dependent data entity. When the entity-relationship diagram is instantiated into a database, the parent data entity becomes the parent database table, the dependent data entity becomes the dependent database table and the data entity relationship becomes the foreign key constraint. The foreign key data attributes, in the dependent data entity, are instantiated as foreign key database columns in the dependent database table. Foreign key constraints are stored in computer memory and are used by the database management system to enforce database referential integrity rules for creating, updating and deleting data records. Foreign key constraints are extremely important within a database because only data record sets with enforced referential integrity may be joined to form a consistent, combined set of data records. Each foreign key constraint in a database provides a bidirectional database access path between two database tables.

Primary key—A primary key is comprised of one or more data attributes within a data entity that are declared in a data model by data modeling software executing on computer processor 4 which is programmed to store the declared primary key in computer memory, such as computer memory 8 of FIG. 1. The primary key of a given data entity is the primary method of uniquely identifying data records within database table. A data entity's primary key is database instantiated as the primary unique index of the database table that was instantiated from the given data entity. The primary unique index of a given database table is used as a means of rapidly selecting unique data records from that database table.

Referential integrity—Referential integrity is a process, often managed by the database management system, which is used to insure the consistency and integrity of data values stored within a computer memory as a database. Database referential integrity is related to joining data records stored in a database table to the data records stored in another database table such as two database table related by a foreign key constraint.

Referential integrity rules—Referential integrity rules are defined in a data model and associated with each data entity relationship. These referential integrity rules define restrictions associated with creating, updating, and deleting data records in related database tables such as related by foreign key constraints.

Repository of metadata—a repository of metadata is an area of computer memory used to store various metadata and information about data systems including data models, entity-relationship diagrams, and other such metadata.

Unique Key—A unique key is declared in an entity-relationship diagram on one or more data attributes of a data entity. This unique key is declared to indicate that, upon database instantiation, a unique index will be formed for the database table instantiated from the data entity.

Unique Index—A unique index is a database object used to constrain the set of data values for a database table stored in one or more computer memories using a database management system, wherein no duplicate data values are allowed in the unique index. For each unique index, the combination of indexed data values for each data record must form a unique index entry for that database table. Any attempts to form a duplicate combination of data values for any unique index will be rejected by the database management system, such as executed by the computer processor 4.

In accordance with at least one embodiment of the present invention, a method is provided, which can be called a "method of defining common data relationships" in computer memory, such as in computer memory 8. This method is utilized for configuring, designing, and/or implementing database tables and data models in one or more computer memories, such as computer memory 8 of FIG. 1, which gives a person who defines data models and database tables an alternative predefined method to link data entities in one or more data models and to link database tables for one or more databases.

FIG. 1 shows a diagram of an apparatus 1 in accordance with an embodiment of the present invention. The apparatus 1 includes an interactive device 2, a computer processor 4, a display device 6, and a computer memory 8. Computer memory 8 may include any type of computer memory, including long term memory such as disk memory in addition to computer random access memory which may lose its values when power is removed. The computer memory 8 may include one or more computer memories. The interactive device 2, the display device 6, and the computer memory 8 communicate with the computer processor 4 via communications links 2a, 6a, and 8a respectively, which may be electronic, computer software, optical, wireless or any other type of communications links. The computer processor 4 may be programmed by computer software to implement the method of defining common data relationships in accordance with the present invention to produce enhanced data models and enhanced databases in the computer memory 8, such as shown by FIG. 1.

Figure 2:
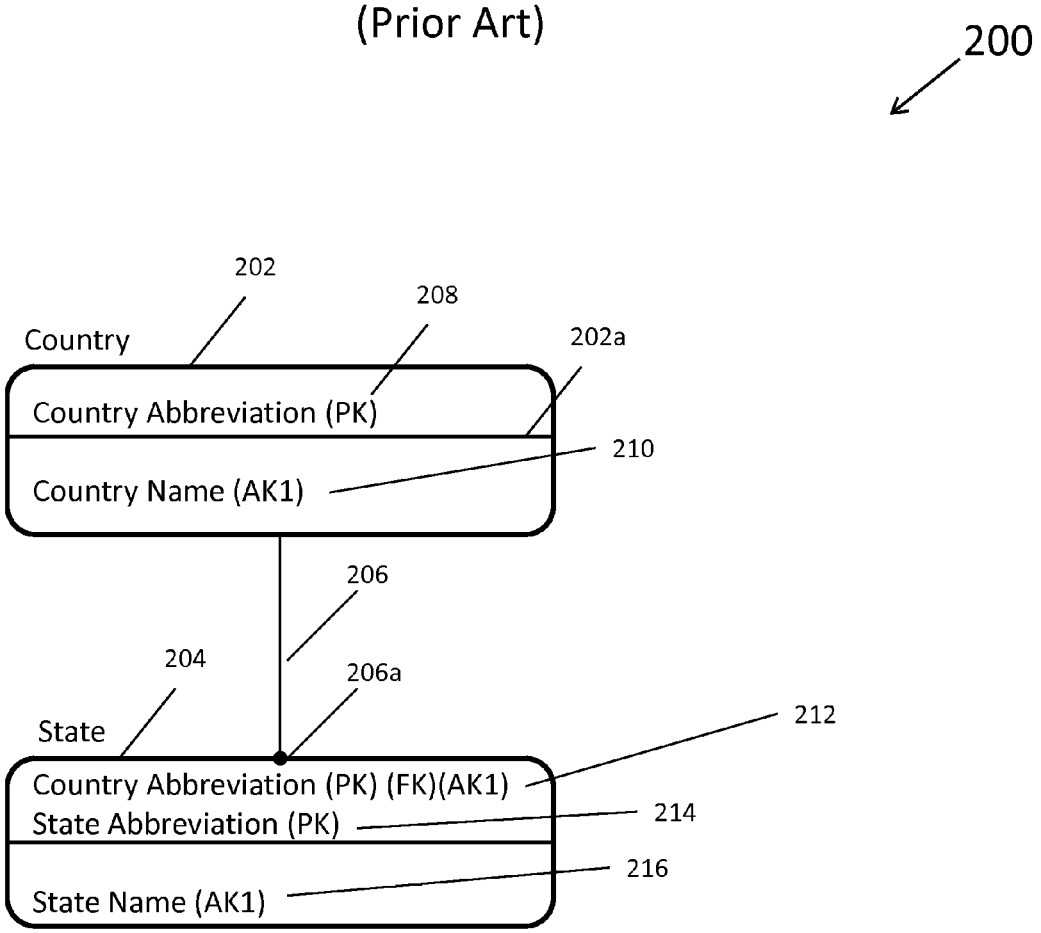
Fig. 2 (Prior Art)
FIG. 2 depicts a prior art simple entity-relationship diagram of a country data entity and a state data entity and a data entity relationship linking the two data entities together that can be displayed on a display device of the apparatus of FIG. 1 or stored in a computer memory of the apparatus of FIG. 1.

FIG. 2 shows ERD (entity-relationship diagram) 200, which may be created by a computer user using a data modeling program and the ERD may be stored in the computer memory 8 of FIG. 1. The ERD 200 contains two data entities, data entities 202 and 204, combined with a single data entity relationship 206 that connects these two data entities. In this representation of an ERD, ERD 200, each of data entities 202 and 204 are represented by a rounded-corner rectangle while the data entity relationship 206 is represented by a line terminated with a filled circle 206a. Each data entity, such as each of 202 and 204, represents a group of related data attributes, such as the data attribute 210, which is labeled country name, and data attribute 208, which is labeled country abbreviation, for data entity 202. In this notation of data entities, the data attributes above a line in the rounded-corned rectangle, such as for example, above line 202a for data entity 202, are declared to be the primary key of the data entity. The primary key data attributes of each data entity are also denoted as such by the (PK) which follows the data attribute's name. This primary key is a unique identifier for the data entity. In addition to the data entity's primary key, each data entity may have zero, one or more alternate keys defined. In FIG. 2, both data entities 202 and 204 contain a single alternate key denoted by the (AK1) following the alternate key's data attributes. In data entity 202, the alternate key is declared by a computer user using a data modeling program upon the single data attribute 210, which is labeled country name and stored in computer memory 8. In data entity 204, the alternate key is a composite alternate key composed from the data attribute 212, which is labeled country abbreviation, and data attribute 216, which is labeled state name. The data entity relationships of entity-relationship diagrams, such as ERD 200, depict a link, normally between two data entities, that allow data attributes from a first data entity, such as data entity 202, to be related to data attributes from the second data entity, such as data entity 204. Under some circumstances, a data entity relationship links one data entity to itself in what is often referred to as a recursive data entity relationship. All data entity relationships link at most two data entities.

Data entity relationship 206, shown in FIG. 2, links the first data entity 202 to the second data entity 204. Note that the data entity 204 contains data attribute 212, denoted by (FK). Data attribute 212 is inherited from the primary key of data entity 202, which is data attribute 208, wherein the data attribute inheritance is implemented by the data modeling program executing on computer processor 4. This inheritance of a first data entity's primary key data attributes or one of that data entity's alternate key data attributes into a second data entity is referred to as a foreign key thus the denotation of (FK). The data entity that donates unique key data attributes, such as data attribute 208 of data entity 202, is referred to as the parent data entity while the data entity that inherits the data attributes, such as data attribute 212 of data entity 204, is referred to as the child data entity. Prior art data entity relationships are parent-child type of data entity relationships where unique key data attributes are always inherited by one of the of related data entities. In the case of the recursive data entity relationship, the parent data entity and the child data entity are the same data entity that still inherits the unique key data attributes.

Figure 3:
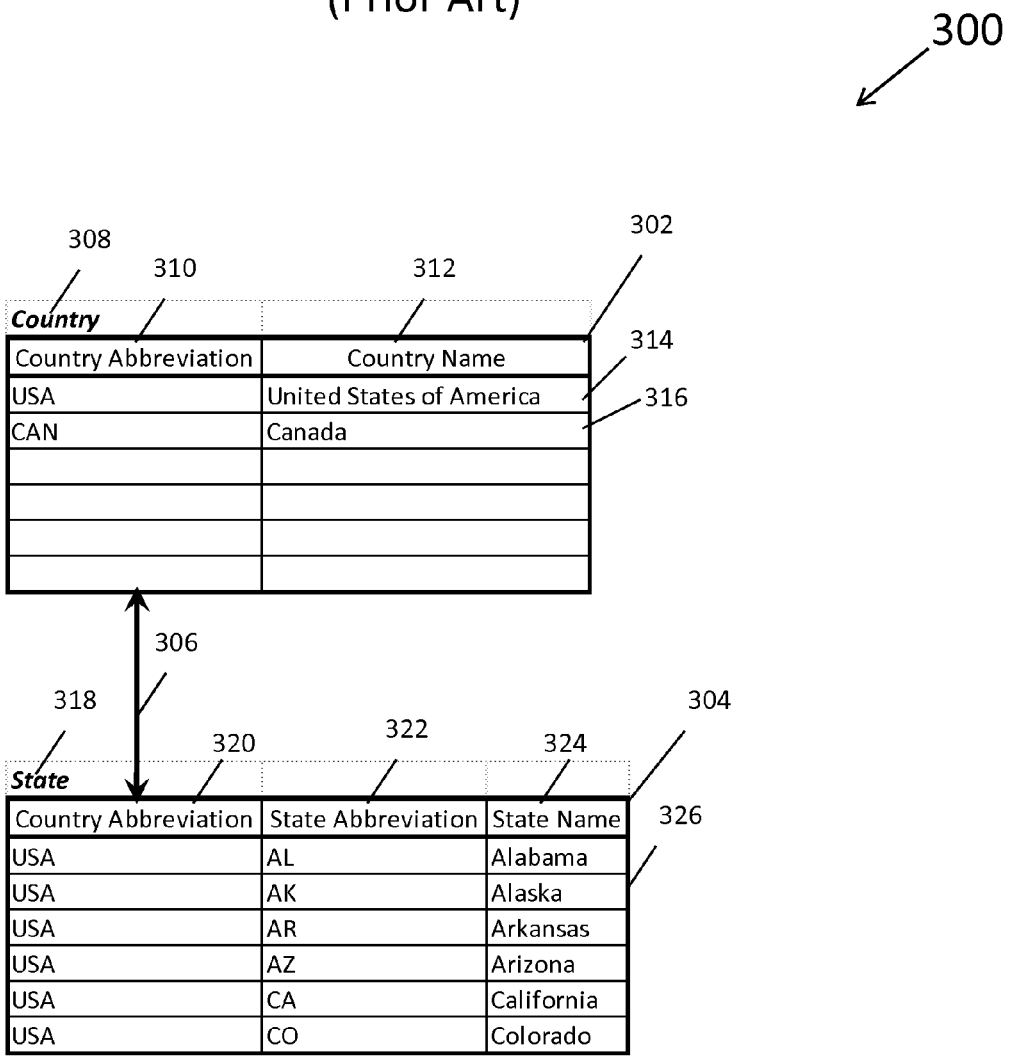
Fig. 3 (Prior Art)
FIG. 3 depicts a prior art pair of database tables linked by a foreign key constraint that was database instantiated from the entity-relationship diagram shown in FIG. 2 and where the database tables were also populated with data values, and where the database tables with their data values can be displayed on a display device of the apparatus of FIG. 1 or stored in a computer memory of the apparatus of FIG. 1.

FIG. 3 is database 300 that results from the database instantiation, in one or more computer memories, such as computer memory 8 of FIG. 1, of the ERD 200 depicted in FIG. 2. Database instantiation may be computer user initiated using a data modeling program where the database instantiation is implemented by one or more database management systems where both the data modeling program and the database management systems are executed in one or more computer processors, such as computer processor 4 of FIG. 1, and the database objects are stored in one or more computer memories, such as computer memory 8 of FIG. 1. Databases table 302 and 304 are database instantiated into database 300, in computer memory, such as computer memory 8, from data entity 202 and 204 respectively of ERD 200 shown in FIG. 2. The primary key index of database table 302 is based upon database column 310, which is instantiated from primary key data attribute 208 of ERD 200. Database table 304 is instantiated into database 300 from data entity 204 in FIG. 2. The primary key index for database table 304 is a composite unique index based upon database columns 320 and 322, which are instantiated from primary key data attributes 212 and 214 of ERD 200.

Beyond the database tables, foreign key constraints are another important type of database object that is database instantiated into any relational database. Foreign key constraint 306 of database 300, shown in FIG. 3, is database instantiated from data entity relationship 206 of ERD 200 shown in FIG. 2. Again, database instantiation is normally initiated by a computer user using a data modeling program. Foreign key constraint 306, of database 300 shown in FIG. 3, is database instantiated to maintain database referential integrity between database column 310 of database table 302 and database column 320 of database table 304. Database referential integrity is normally maintained by a database management system executing in a computer processor such as computer processor 4 of FIG. 1. Once a foreign key constraint is database instantiated, the database management system computer software program executed by computer processor 4, and stored in computer memory 8, is programmed to enforce the referential integrity rules for that foreign key constraint, such as the prior art referential integrity rules for foreign key constraints listed in spreadsheet 400 of FIG. 4.

In any relational database, the foreign key constraints are very important. Foreign key constraints are used within a database management system to maintain both the database referential integrity of the data records and to provide bidirectional database access paths between database tables. It is important to note that prior art database referential integrity and prior art database access paths are only maintained within a single database by a database management system. Prior art data modeling programs do not allow for the declaration of data entity relationships between two data entities where each data entity is located in a different data model database. Prior art database management systems do not enforce database referential integrity between two or more databases and do not support database access paths between two or more databases.

FIG. 4 depicts spreadsheet 400, which elucidates prior art referential integrity rules. These referential integrity rules are often declared for each data entity relationship of an ERD such as data entity relationship 206 of ERD 200 shown in FIG. 2, where the referential integrity rules declaration is made by a computer user using a data modeling program executing on computer processor 4 and stored in computer memory 8 of FIG. 1. Once the referential integrity rules are database instantiated as foreign key constraints, such as foreign key constraint 306 of database 300 shown in FIG. 3, the database management system enforces the referential integrity rules. In some rare cases, the referential integrity rules are not database instantiated. Instead, referential integrity rules are programmed into other software application programs to be enforced by those software application programs executing on a computer processor, such as computer processor 4 of FIG. 1.

Spreadsheet column 410 of spreadsheet 400 contains the database actions that may be programmed in computer memory, such as computer memory 8, and executed by computer processor 4 using a database management system, for a pair of database tables constrained by a foreign key constraint. Spreadsheet column 412 denotes the parent table of the foreign key constraint, such as database table 302 of FIG. 3. The parent database table associated with a foreign key constraint is established as the database table that donates the unique index database table columns such as unique index database column 310 of database table 302 of database 300. Spreadsheet column 414 denotes the child table of the foreign key constraint, such as database table 304 of foreign key constraint 306 shown in FIG. 3. The child database table associated with a foreign key constraint is established as the database table that inherited foreign key database table columns such as database table column 320 of child database table 304 shown in FIG. 3.

Row 416 of spreadsheet 400 represents the referential integrity rules for creating database data records, such as data record 314 in the parent database table 302, and creating database data records, such as data record 326 in the child database table 304 of database 300, where these database tables are associated with a database foreign key constraint, such as foreign key constraint 306 of database 300. As noted in spreadsheet 400, row 416 and column 412, a data record for the parent database table, such as data record 314 for the parent database table 302 shown in FIG. 3, may be created without restrictions. However, as noted in spreadsheet 400 of FIG. 4, row 416 and column 414, a data record for the child database table may only be created if the associated data record already exists in the parent database table. For example, in database 300 shown in FIG. 3, data record 326 for child database table 304 with a data value of "USA" in foreign key column 320 may only be created by the computer processor 4 in computer memory, such as computer memory 8, if the associated parent database table data record already exists such as data record 314 of parent database table 302 with a data value of "USA" in unique index column 310. If data record 314 of parent database table 302 did not exist, the database management system computer program executed by the computer processor 4 is programmed to not allow the creation of data record 326 in child database table 304 because that would violate the referential integrity rules, stored in computer memory 8, established for foreign key constraint 306 of database 300.

Row 418 of spreadsheet 400 represents the referential integrity rules for updating the data records of the parent database table and for updating the data records of the child database table associated with a database foreign key constraint. As noted in spreadsheet 400, row 418 and column 412, a first set of data values of the unique index database table column of data records in the parent database table may not be updated if one or more data records from the child database table's foreign key columns contain the same data values as that first set of data values. Again, these referential integrity rules are normally enforced by the database management system computer program executing by computer processor 4 where the referential integrity rules and the data values are stored in one or more memories 8 of FIG. 1. For example, the referential integrity rule for row 418, stored in computer memory 8, and column 412 indicates that any unique index column data vales, such as data value "USA" of unique index column 310 of a parent data record such as data record 314 of parent database table 302, may not be updated if a foreign key data value, such as data value "USA" of foreign key column 320 of data record 326 from the child database table 304, exists. Since the parent data record has a related child data record, the unique key column data value may not be updated, in accordance with referential integrity rules stored in computer memory 8, which are implemented by the computer processor 4. However, the unique index column data value of "CAN" for data record 316 of parent database table 302 may be updated to a different data value by the computer processor 4, in accordance with referential integrity rules stored in computer memory 8 for a computer program executed by the computer processor 4, since that data value of "CAN" is not found in database table foreign key column 320 of child database table 304.

Row 418 column 414 of spreadsheet 400 represents the referential integrity rule for updating the foreign key data value of the child database table's data records. For this referential integrity rule, the foreign key data values of the child database table may be updated, to any of the existing unique key data values of the parent database table. For example, the data value "USA" of foreign key child database table column 320 of data record 326 of database 300 is restricted to the unique index column data values by the computer processor 4, such as unique index column 310 of the parent database table 302. In this case, the data value "USA" of database table column 320 of database record 326 may be updated in computer memory 8 to a data value of "CAN" since that data value exists in the unique index column 310 of data record 316 of parent database table 302, in computer memory 8.

Row 420 of spreadsheet 400 represents the referential integrity rules, stored in computer memory 8 and implemented by computer processor 4, for deleting data records from related database tables constrained by a foreign key constraint. Row 420 column 412 is the referential integrity rule for deleting data records from the parent database table such as data record 314 of parent database table 302 from database 300. Data records from a parent database table, such as database table 302 of database 300, may not be deleted, as directed by the computer processor 4, as programmed by referential rules stored in computer memory 8, if data records from the child database table, such as database table 304, have the same foreign key column data values. For example, data record 314 from parent database table 302 with a unique index database table column 310 has a data value of "USA" and may not be deleted, as directed by the computer processor 4, as programmed by referential rules stored in computer memory 8, because, data record 326 of child database table 304, has the same foreign key database table column 320 data value of "USA". If data record 314 of parent database table 302 were to be deleted, then, data record 326 of child database table 304 would become an "orphan" data record; that is a "parentless child" data record, in computer memory 8. Therefore, the database management system implemented by computer processor 4 in accordance with programming stored in computer memory 8 does not allow data record 314 to be deleted from database table 302 of database 300 because of foreign key constraint 306. However, data record 316 of parent database table 302 with unique index column 310 and a data value of "CAN" may be deleted, as directed by the computer processor 4, since none of the data values of foreign key column 320 of child database table 304 contain a data value of "CAN".

Row 420 column 414 of spreadsheet 400 shown in FIG. 4 contains the referential integrity rule for deleting data records from child database tables. This foreign key constraint referential integrity rule states that any data record from a child database table may be deleted without restriction, and this referential integrity rule or parameters relating to this rule, is stored in computer memory 8 and implemented by computer processor 4. Therefore, data record 326 from child database table 304 of database 300 may be deleted without restriction from database foreign key constraint 306.

FIG. 5 depicts a data architecture diagram 500, in accordance with an embodiment of the present invention that shows three different data model databases within a single data model, which may be stored in one or more computer memories, such as computer memory 8. This data architecture diagram, which may be created and maintained using a data modeling program executing by computer processor 4 and stored in computer memory 8, contains three data model databases that are Master Database 504, Database B 514, and Database C 524. Each data model database contains a single common data entity, common data entity 502 is contained within Master Database 504, common data entity 512 is contained within Database B 514, and common data entity 522 is contained within Database C 524. Each of the three common data entities contains the same data attributes, such as data attributes labeled Country Abbreviation for data attributes 508, 518, and 528 along with data attributes labeled Country Name for data attributes 510, 520, and 530. Each of the three common data entities also contains the same declared primary key that is labeled Country Abbreviation (PK) (CK) for primary keys 508, 518, and 528. As a result of this unique key commonality across these three common data entities, each of the three common data entities' unique keys 508, 518, and 528 also have the (CK) designation for the common unique key. These common data entities participate in the common entity relationship set 538 labeled Country Abbreviation 540. Each common entity relationship set must have a unique label, stored in computer memory 8, to uniquely identify the common entity relationship set and to distinguish that common entity relationship set from all others within a data architecture diagram, stored in computer memory 8.

Common entity relationship set 538 is a composite of common data entity 502 that is related by common entity master relationship 532, common data entity 512 that is related by common entity relationship 534 and common data entity 522 that is related by common entity relationship 536. Common entity master relationship 532 is a common entity master relationship as indicated by the arrow head at the end of the common entity relationship line in the data architecture diagram 500 stored in computer memory 8. Each common entity relationship set, such as common entity master relationship set 538, may contain only one common entity master relationship, such as common entity relationship 532. This common entity master relationship indicates that data entity 502 is declared as the designed source of the single common set of master data records, where this declaration may be established by a computer user using an enhanced data modeling program and storing the data architecture diagram in one or more computer memories, such as computer memory 8. Not all common entity relationships, such as common entity relationship set 538, have a common master relationship. In some cases, the common set of master data records may be sourced from a data provider external to the organization. The common set of master data records may also be provided from an SQL (Structured Query Language—a special purpose computer programming language used in conjunction with a database management system) script executed by the computer processor 4, and stored in the computer memory 8, wherein this SQL script is a computer program used to populate common database tables from a common database table set using one or more database management systems. Therefore, the common entity relationship master is optional for a common entity relationship set. However, each common entity relationship set must have a single common set of master data values declared for the purposes of enforcing common index integrity rules within the common unique index set that results from the database instantiation of the common entity relationship set. The declaration of a common set of master data values for a specific common database table set would normally be established by a computer user using an enhanced data modeling program executing on computer processor 4 and stored in computer memory 8 of FIG. 1.

Prior art data entity relationships in prior art data models do not address sources of data for their related data entities. Prior art data models do not address common sets of master data values. While common entity relationship sets support any number of related data entities, prior art data models do not allow for more than two data entities in a data entity relationship. While common entity relationships may relate data entities from multiple data model databases, prior art data entity relationships are only allowed within one database. In one or more embodiments of the current invention, data models need to support the declaration of multiple data model databases within each data model. In one or more embodiments of the current invention, data entities need to be assigned, in computer memory 8, to a specific declared database such as data entity 502 labeled Country 506 assigned to the Master Database 504.

A common entity relationship, stored in one or more computer memories, such as computer memory 8, is used in data models to denote a peer-to-peer type of relationship where each related common data entity contains a declared common unique key that is the same common unique key in each related common data entity, stored in one or more computer memories, such as computer memory 8. Common entity relationships are peer-to-peer type relationships wherein the common unique key data attributes exist prior to adding the common entity relationship. Also, peer-to-peer type relationships have common unique key data attributes that are neither donated nor inherited unlike data entity relationships where foreign key data attributes are donated by the parent data entity and inherited by the child data entity. Since the common entity relationships are peer-to-peer type relationships, the number of common data entities participating in the common entity relationship set is not limited.

Some entity-relationship diagrams may include supertype and subtype groups of closely related data entities. These supertype and subtype data entities are normally transformed into a cluster of related data entities linked by data entity relationships where these existing foreign key links and are not candidates for common entity relationships.

FIG. 6 depicts data architecture 600, which may be database instantiated into multiple databases using one or more database management systems, wherein the multiple databases may be stored in one or more computer memories, such as computer memory 8. Data architecture 600 depicts three different physical databases which are Master Database 604, Database B 624, and Database C 644, where each database contains a single common database table. Common database table master 602 is contained in database 604, common database table 622 is contained in database 624, and common database table 642 is contained in database 644. These three common database tables are related by common index master constraint set 668, stored in computer memory, such as computer memory 8, where common index master constraint 662 is referenced as the common index master constraint for common index master constraint set 668.

The three databases are database instantiated, in computer memory, such as computer memory 8, from data architecture diagram 500 where database 604 is derived from data model database 504 and database 624 is derived from data model database 514, and database 644 is derived from data model database 524. The three common database tables, 602, 622, and 642, are database instantiated, in computer memory, such as computer memory 8, into their respective databases as derived from common data entities 502, 512, and 522 of FIG. 5 respectively. Each of the three common database tables contains the same database table columns, such as database table columns labeled Country Abbreviation 608, 628, and 648 along with database table columns labeled Country Name 610, 630, and 650. Each of these database table columns are database instantiated, in computer memory, such as computer memory 8, by the computer processor 4, as programmed in accordance with an embodiment of the present invention as derived from data attributes 508, 518, 528, 510, 520, and 530 of FIG. 5 respectively.

Each of the three common database tables 602, 622, and 642 also contain a common unique index that is database instantiated, in computer memory 8 by the computer processor 4, as derived from common unique keys (CK) 508, 518, and 528, which are the declared primary keys (PK), as shown in FIG. 5 respectively. Each of these common unique indexes are populated in computer memory 8, by the computer processor 4, from a single common set of master data values, such as data values "USA" and "CAN", of the database table columns labeled Country Abbreviation 608, 628, and 648. As a result of this unique index commonality between common database tables 602, 622, and 642, and the common set of master data, stored in computer memory, such as computer memory 8, used to populate these database tables by the computer processor 4, each of the three common database tables may participate in the common index master constraint set 668.

Common index master constraint set 668 shown in FIG. 6 is instantiated in computer memory 8 by the computer processor 4 in accordance with computer programming in at least one embodiment of the present invention, from common entity relationship set 538 as shown in FIG. 5. Common entity master relationship 532 as shown in FIG. 5 is database instantiated as common index master constraint 662 shown in FIG. 6. Common index master constraint 662 has the arrow end of the common index master constraint pointing away from the associated common database table master 602 to denote this as the common index master constraint. The common index master constraint 662 is a declaration that common database table master 602 from Master Database 604 contains the common set of master data values for common index master constraint set 668 shown in FIG. 6. Common entity relationships 534 and 536 are database instantiated in computer memory 8, by the computer processor 4, as common index master constraints 664 and 666 respectively. The common index master constraints are used to ensure that a single common set of master data values, such as the common set of master data values in common database table master 602, is populated into common database tables 622 and 642, respectively. The common index integrity rules for this common index master constraint are detailed in spreadsheet 700 of FIG. 7, and are stored in computer memory 8, and implemented by the computer processor 4 in accordance with computer programming stored in the computer memory 8.

A common unique index, such as common unique indexes 628 and 648 depicted in FIG. 6, is used in a database to denote a peer-to-peer type of database access path where each related common database table, such as common database tables 622 and 642 depicted in FIG. 6, contains a declared common unique index that is the same common unique index in each related common database table and wherein each common unique index, such as declared common unique indexes 628 and 648 of FIG. 6, is populated, in computer memory 8 by the computer processor 4, from a single common set of master data values such as the common set of master data values displayed in common database table master 602. The common index integrity rules for common unique indexes, such as common unique indexes 628 and 648, are detailed in spreadsheet 800 of FIG. 8, and are stored in computer memory 8, implemented by computer processor 4, in accordance with computer programming stored in computer memory 8.

FIG. 7 shows a spreadsheet of common index integrity rules, which may be stored in computer memory 8, declared for each common entity master relationship, such as common entity master relationship 532, depicted in data architecture diagram 500 shown in FIG. 5. These common index integrity rules are used to enforce the common index master constraints, such as common index master constraint 662 depicted in data architecture 600 shown in FIG. 6.

Not every common entity relationship will have a common entity master relationship declared to support the common set of master data values. In some cases, the common set of master data values could be database instantiated in computer memory 8 by the computer processor 4 in accordance with computer programming or software stored in computer memory 8, into each common database table of a single set of common database tables using a computer program. In these cases, the common set of master data values would be a static set of data values. The computer program, implemented by the computer processor 4, to populate each common database table could be written using a SQL script of database table data record insert statements. Also, the common set of master data values may be provided from a third party. For example, a common database table of postal addresses may be verified against a master set of postal address data values provided as a service by a third party usually for a fee. However, it is important that a common set of master data values be available in computer memory 8, for each common database table set stored in computer memory 8, as a method to ensure common unique index integrity between the common database tables of the common database table set.

As determined from spreadsheet 702 and column 706, for database action "create" shown in spreadsheet row 710, the creation of common database table master data records is unrestricted. For example, any data records for common database table master 602 of FIG. 6, such as data records 612, 614, 616, 618, and 620 may be created, by the computer processor 4, in accordance with computer software stored in the computer memory 8, without consideration for the data records of the other common database tables of that common database table set stored in computer memory 8, such as common database table 622 and 642.

As determined from spreadsheet 702 and column 708, for the database action "create" shown in spreadsheet row 710, the creation of dependent common database table data records, in the computer memory 8, by the computer processor 4, in at least one embodiment in accordance with an embodiment of the present invention, are restricted to the data records of the common database table master data records, stored in computer memory 8. For example, data records 632, 634, and 636 of common database table 622 as well as data records 652, 654, 656, and 658 of common database table 642 must already exist in common database table master 602. Common database table 622 data records 632, 634, and 636 are individually restricted by the computer processor 4 by data records 612, 614, and 620 of common database table master 602 respectively. Common database table 642 data records 652, 654, 656, and 658 are individually restricted by the computer processor 4 by data records 612, 614, 618, and 616 of common database table master 602 respectively.

As determined from spreadsheet 702 and column 706, for database action "update" shown in spreadsheet row 712, updating the common database table master data record's common unique index data values are restricted by the computer processor 4, implementing software stored in the computer memory 8 in accordance with an embodiment of the present invention. Any common database master data record that has its common unique index data values referenced by one or more dependent data records from any dependent common database table of that common database table set, may not have its common unique index data values updated, by the computer processor 4, implementing computer software stored in the computer memory 8 in accordance with an embodiment of the present invention. For example, any data records for common database table master 602 of FIG. 6, such as data records 612, 614, 616, 618, and 620, may not have their common unique index data values updated, such as the data values of column 608, if these data values are used in any of the common database tables such as common database tables 622 and 642. As an example of this restriction, dependent common database table 622 has data record 632 where the common unique index column 628 has a data value of "USA". Common database table master 602 has a common unique index column 608 with a data value of "USA" in data record 612. Because a common database table has the same common unique index data values as the common unique index data value of the common database table master, that common database table master's common unique index data value may not be updated, as directed by computer software stored in the computer memory 8 and executed by computer processor 4 in accordance with one or more embodiments of the present invention.

As determined from spreadsheet 702 and column 708, for database action "update" shown in spreadsheet row 712, updating the common unique index data values of any dependent common database table is restricted, by computer software implemented by the computer processor 4, and stored in the computer memory 8, in accordance with one or more embodiments of the present invention. The common unique index data values of a dependent common database table must always be equal to a common unique index data value from the common database table master, in accordance with at least one embodiment of the present invention and as implemented by computer software implemented by computer processor 4 and stored in the computer memory 8. For example, one would be restricted to update the dependent common unique index data value "USA" to "US" for database table column 628 of data record 632 in dependent common database table 622. Since, the data value "US" does not exist as a data value in the common unique index column 608 of common database table master 602, the database management system or some other executing computer software program stored in computer memory 8 and implemented by computer processor 4 rejects the proposed data value update.

As determined from spreadsheet 702 and column 706, for database action "delete" shown in spreadsheet row 714, deletion of a common database table master's data record is restricted, by the computer processor 4 implementing computer software stored in computer memory 8, in accordance with one or more embodiments of the present invention, if the data record is referenced by a data record in any of the dependent common database tables, stored in the computer memory 8. For example, the computer processor 4, as programmed by computer software stored in the computer memory 8 will not allow the data value of "USA" of data record 612 of the common database table master 602 of FIG. 6 with common unique index 608 to be deleted, as this data value of "USA" is referenced from common unique index 628 of data record 632 of dependent common database tables 622 depicted in FIG. 6.

As determined from spreadsheet 702 and column 708, for database action "delete" shown in spreadsheet row 714, deletion of dependent common database table data records is unrestricted, as directed by the computer processor 4, in accordance with computer software stored in the computer memory 8, in accordance with one or more embodiments of the present invention, by data records of common database table master of that common database table set. For example, any data records for common database table 622 of FIG. 6, such as data records 632, 634, and 636 may be deleted, as directed by the computer processor 4, without consideration for the data values of common database table master 602 as depicted in FIG. 6.

In analysis of the common index integrity rules, stored in the computer memory 8, and detailed in spreadsheet 702, it becomes apparent that each of the dependent common database tables, such as common database tables 622 and 642 of FIG. 6, may only contain a subset of the data records stored in the common database table master 602, in at least one embodiment of the present invention, as directed by the computer processor 4 implementing computer software stored in the computer memory 8, in accordance with the present invention.

Another method to insure that common index integrity rules are not violated is to develop a data load script or data load program for a common database table set. The data load program is used to insert the entire common set of master data values into each of the common database tables for that common database table set. A computer processor may be programmed by computer software stored in computer memory, to ensure that once the common set of master data values is loaded into each common database table, data records may not be created, may not be updated, or may not be deleted from any of the common database tables for the common database table set unless a data record modification script or a data record modification computer program is applied to all the common database tables for that common database table set.

Spreadsheet 802 of FIG. 8 contains common index integrity rules, stored in computer memory 8, for common unique indexes between a group of common database tables such as common database tables 622 and 642 of data architecture 600 depicted in FIG. 6. As shown in spreadsheet 802, there are no restrictions, stored in computer memory 8 and to be implemented by the computer processor 4, in accordance with one or more embodiments of the present invention, on either common database tables, such as common database tables 622 and 642 depicted in FIG. 6, for the creation of common database table data records as detailed in spreadsheet row 810. As shown in spreadsheet 802, there are no restrictions on either common database table, such as common database tables 622 and 642 depicted in FIG. 6, for the update of common database table data records as detailed in spreadsheet row 812. As shown in spreadsheet 802, there are no restrictions on either common database table, such as common database tables 622 and 642 depicted in FIG. 6, for the deletion of common database table data records as detailed in spreadsheet row 814. These common index integrity rules, stored in computer memory 8, confirm that common database tables, such as common database table 622, may be maintained, in accordance with one or more embodiments of the present invention, by the computer processor 4 implementing computer software stored in the computer memory 8, independent of any other common database table such as common database table 642.

Common database tables in a common database table set are peer database tables in that their database actions are independent within that common database table set. In at least one embodiment, there are no common index integrity restrictions between common database tables of the same common database table set. The only common index integrity requirement is that every common database table from a single common database table set is each populated from a common set of master data values. It is only the single common database table master that may be declared for each common database table set that restricts the database actions of the dependent common database tables to enforce common index integrity within a common unique index set.

Flow chart 900 of FIG. 9 contains processes 906, 916, 920, 922, 934, and 938, along with decisions 910 and 928, and data storage areas 942, 944, 946, and 948, as well as process flows 904, 908, 912, 914, 918, 924, 926, 930, 932, 936, and 940 and terminals 902 and 948. Flow chart 900 depicts both the definition of data architecture diagram components and the database instantiation of these components in computer memory 8, by action of the computer processor 4 as programmed by computer software stored in computer memory 8, in accordance with one or more embodiments of the present invention. In at least one embodiment of this invention, computer users define data architecture diagrams using a data modeling program. In at least one embodiment of this invention, the database instantiation of the data architecture diagram components into the database management system is achieved from a SQL script generated from the data modeling program and executed by the database management system.

Flow chart 900 depicts a process of defining common data entities, such as common data entities 502, 512, and 522, along with the declaration of common unique keys such as common unique keys 508, 518, and 528 as shown in data architecture diagram 500 shown in FIG. 5. Flow chart 900 also depicts a process of defining common entity relationships such as common entity relationships 532, 534, and 536 depicted in data architecture diagram 500 shown in FIG. 5. Flow chart 900 also depicts a process of defining common sets of master data values such as the common set of master data values shown in common database table master 602 as depicted in data architecture 600 shown in FIG. 6. After the data architecture diagram has been completed, the data architecture diagram components are database instantiated. Common data entities are database instantiated as common database tables, such as common database tables 622 and 642 that are depicted in FIG. 6. Common unique keys are database instantiated as common unique indexes, such as common unique indexes 608, 628 and 648 depicted in data architecture 600 FIG. 6. Common entity relationships are database instantiated as common index master constraints, such as common index master constraints 662, 664, and 666 depicted in FIG. 6. This flow chart 900 depicts only one application for the definition of and the database instantiation of common database table, common unique indexes, and common index master constraints.

Flow chart 900 begins at terminal 902. From terminal 902, the computer processor 4, executing computer software stored in computer memory 8, initiates process flow 904 which initiates flow chart process 906. Flow chart process 906 represents the process of selecting or creating a data entity within a data model, such as data entity 202 of ERD 200 from FIG. 2, which is to be defined as a common data entity, such as common data entity 512 of data architecture diagram 500 shown in FIG. 5. First, a computer user selects the data models that are retrieved by the computer processor 4 from the data model computer storage 942, stored in the computer memory 8. The selected or created data entity, stored in computer memory 8, to be converted, in at least one embodiment of the present invention, must contain at least one declared unique key, such as unique key 208, which is the primary key (PK) of data entity 202 or unique key 210, which is an alternate key (AK1), of data entity 202 as shown in FIG. 2. For this example of process flow chart 900, data entity 202 of FIG. 2 will be converted by the computer processor 4 to common data entity 512 of data architecture diagram 500 of FIG. 5, and common data entity 512 will be stored in computer memory 8.

Once the data entity has been selected or created by the computer processor 4, process flow 908 is followed by the computer processor 4 to flow chart decision 910. Flow chart decision 910 is used by the computer processor 4 to determine whether a unique key, such as primary key 208 of data entity 202, has been established as the basis for a common entity relationship set such as common entity relationship set 538 of FIG. 5. Established common entity relationship sets are stored by the computer processor 4, in the common entity relationships computer storage 944 in the computer memory 8, as depicted in FIG. 9. A search of the common unique keys recorded in data storage area 944 is initiated by the computer processor 4 in accordance with computer software stored in the computer memory 8, to determine if the selected unique key is already designated as a common unique key. If the selected unique key, such as unique key 208 of data entity 202 shown in FIG. 2, is found to be defined as a common unique key by the computer processor 4, process flow 912 is followed by the computer processor 4 to flow chart process 916. If the selected unique key is not found to be a common unique key, process flow 914 is followed to flow chart process 920 by computer processor 4.

When process flow 912 is followed by the computer processor 4 from flow chart decision 910, flow chart process 916 is executed. First, the selected unique key of the selected or created data entity, such as data entity 202 of FIG. 2, is declared by a computer user using a data modeling program executing on the computer processor 4 to also be a common unique key, such as common unique key 518 of FIG. 5 labeled Country Abbreviation (PK)(CK) where the (CK) designation is a result of the declaration and is stored in computer memory 8. Next, a common entity relationship, such as common entity relationship 534 of data architecture diagram 500 shown in FIG. 5, is added by a computer user using a data modeling program executing on the computer processor 4, to the data model and stored in data storage 942 in the computer memory 8 as an update to the appropriate data model. Also, the new common data entity, such as common data entity 512 shown in FIG. 5, which was formerly data entity 202 shown in FIG. 2, is now added by the computer processor 4 to the data storage area 944 of the computer memory 8 as part of the common entity relationship set information. Once the data storage has been completed, process flow 918 and process flow 926 are followed by the computer processor 4 to flow chart decision 928.

When process flow 914 is followed by the computer processor 4 from flow chart decision 910, flow chart process 920 is executed by the computer processor 4 to establish and store in computer memory 8, the selected unique key from the selected data entity as a common unique key of the now common data entity. First, in the appropriate data model, such as data model 200 shown in FIG. 2, in the computer memory 8, the selected or created data entity, such as data entity 202, is declared to be a common data entity by a computer user using an enhanced data modeling program in the computer memory 8 by the computer processor 4. This common data entity declaration is accomplished by the computer processor 4 converting the selected unique key of that selected data entity to a declared common unique key in the computer memory 8. In this case, the selected unique key data attributes, such as unique key data attribute 208 of selected data entity 202 shown in FIG. 2, is declared by the computer processor 4 to be a common unique key, such as common unique key 518 of common data entity 512 shown in FIG. 5. The common unique key declaration results in the (CK) designation that is shown in common unique key 518 of common data entity 512 in FIG. 5. Next, a common entity relationship, such as common entity relationship 534 also shown in FIG. 5, is established by the computer processor 4, as a basis for a new common entity relationship set, such as common entity relationship set 538 of data architecture diagram 500 shown in FIG. 5. A new common entity relationship, such as common entity relationship 534 shown in FIG. 5, is established in data storage area 944 of the computer memory 8, by the computer processor 4, with a unique common entity relationship set name, such as common entity relationship set name 540 of common entity relationship set 538 of data architecture diagram 500 shown in FIG. 5. This unique common entity relationship set name is used to distinguish this newly formed common entity relationship set, in the computer memory 8, from all other common entity relationship sets that may be part of this data architecture diagram 500, in the computer memory 8. Once the data storage has been completed, process flow 924 is followed by the computer processor 4, to flow chart process 922.

In flow chart process 922, a common set of master data values for the newly formed common entity relationship set is defined by a computer user using a data modeling program executing on computer processor 4, in the computer memory 8. A common set of master data values may come from several sources including from a designated common database table in computer memory 8, from a third-party reference data provider in one or more computer memories, such as computer memory 8, or from a computer program script, implemented by computer processor 4, that is used to populate in computer memory 8, all of the common database tables with data values from a single common database table set in computer memory 8. In any event, the common set of master data values must be defined and associated to the newly formed common entity relationship set and stored in data storage area 944, in computer memory 8, by the computer processor 4 in accordance with at least one embodiment of the present invention. If the source of the common set of master data values is a designated common database table, that common database table's representative common data entity may be updated by the computer processor 4, in its data model by adding a common entity relationship master, such as common entity relationship master 532 of data architecture diagram 500 shown in FIG. 5, into the appropriate data model stored in data storage area 942, in the computer memory 8. In addition, the common set of master data values will be added, by the computer processor 4, to data storage area 946, in the computer memory 8, in accordance with a computer software program stored in computer memory 8. After the data storage has been completed, process flow 926 is followed by the computer processor 4 to flow chart decision 928.

Flow chart decision 928 is used by the computer processor 4 to determine if the data modeling portion of the process flow has been completed. If more data entities need to be converted to common data entities, process flow 930 is followed by the computer processor 4 to return to flow chart process 906. If the data modeling portion of the process flow has been completed, that is, there are no more data entities to be converted into common data entities, process flow 932 is followed by the computer processor 4 to flow chart process 934.

During flow chart process 934, the computer processor 4 reads the data models from data storage area 942 of the computer memory 8 that have been changed since the last database instantiation of their associated physical databases in computer memory 8 into their respective database management systems in computer memory 8. The new and the updated data model objects in these data models in computer memory 8, are used by the computer processor 4 to generate data definition language scripts (programs) that are then submitted to the database management system executing on computer processor 4 or the new and the updated data model objects are database instantiated directly by the computer processor 4 into their respective databases of computer memory 8 using the database management systems implemented by computer processor 4. Once all of the new and the updated data model objects have been database instantiated by computer processor 4 into data storage area 948 of computer memory 8, flow chart process flow 936 is followed by computer processor 4 to flow chart process 938.

The computer processor 4 uses flow chart process 938 to populate common database tables in computer memory 8 with the common set of master data values needed to support the common unique index integrity of the common unique indexes, such as common unique index 628 shown in FIG. 6 using common index integrity rules, such as the common index integrity rules for common index master constraints detailed in spreadsheet 702 shown in FIG. 7. Each common database table of the common database table set is populated by the computer processor 4 with data from the common set of master data values stored in computer memory 8 via the database management system implemented by the computer processor 4, while it enforces the appropriate common index integrity rules programmed into computer processor 4, which is stored in the computer memory 8. Once the common set of master data values have been established in the computer memory 8 in the common database table set, process flow 940 is followed by the computer processor 4 to the flow chart terminator 950 where the flow chart ends.

I claim:

[1. A method comprising using a computer processor to access a first repository of metadata in a computer memory;

using a computer processor to store a first data entity-relationship diagram in the first repository of metadata, wherein the first data entity-relationship diagram includes a plurality of data entities and a plurality of data entity relationships stored in the computer memory, such that each of the plurality of data entity relationships links one of the plurality of data entities with only one of the plurality of data entities;

wherein each of the plurality of data entities relates to one of a plurality of overall topics;

wherein the first data entity-relationship diagram includes a first data entity of the plurality of data entities relating to a first data entity overall topic of the plurality of overall topics;

wherein the first data entity includes a first data attribute relating to a sub topic of the first data entity overall topic; and the method further comprising using a computer processor to declare the first data attribute to be a first unique key for the first data entity by storing a first unique key indicator in the computer memory to indicate that the first data attribute is a first unique key for the first data entity;

using a computer processor to determine that the first data attribute is a first unique key for the first data entity, wherein the first data entity is comprised of a plurality of instances, and the first data attribute uniquely identifies each of the plurality of instances of the first data entity;

wherein the first data entity-relationship diagram includes a second data entity of the plurality of data entities relating to a second data entity overall topic of the plurality of overall topics;

wherein the second data entity includes a second data attribute relating to a sub topic of the second data entity overall topic; and the method further comprising using a computer processor to declare the second data attribute to be a second unique key for the second data entity by storing a second unique key indicator in the computer memory to indicate that the second data attribute is a second unique key of the second data entity;

using a computer processor to determine that the second data attribute is a second unique key for the second data entity; wherein the second data entity is comprised of a plurality of instances, and the second data attribute uniquely identifies each of the plurality of instances of the second data entity;

using a computer processor to add a first common entity relationship set as data to the first repository of metadata; wherein the first common entity relationship set groups together a plurality of common group unique keys wherein each of the plurality of common group unique keys is the same as each of the other of the plurality of common group unique keys, except that each of the plurality of common group unique keys includes a data entity link stored in the computer memory which specifies a data entity of the plurality of data entities to which each of the common group unique keys is related, such that each of the plurality of common group unique keys is related to a different data entity of the plurality of data entities;

wherein the plurality of common group keys includes the first data attribute and the second data attribute;

and the method further comprising using a computer processor to add a first common entity relationship indicator to computer memory to indicate that the first data attribute is a member of the first common entity relationship set in the first repository of metadata; and using a computer processor to add a second common entity relationship indicator to the computer memory to indicate that the second data attribute is a member of the first common entity relationship set in the first repository of metadata; and using a computer processor to store a common entity relationship link in the first data entity-relationship diagram in the computer memory, wherein the common entity relationship link links the first data attribute of the first data entity and the second data attribute of the second data entity, wherein the common entity relationship link is a peer-to-peer type of link; and wherein the first data entity-relationship diagram, including the first data entity, the second data entity, the first data attribute and the second data attribute are stored in the first repository of metadata prior to adding the first common entity relationship set as data to the first repository of metadata.]

[2. The method of claim 1 further comprising using a computer processor to store a first common set of master data indicator in the first repository of metadata;

wherein each of the plurality of data entities has a plurality of instances;

wherein two or more of the plurality of data entities are linked to the first common entity relationship set by one or more of the plurality of common group unique keys;

wherein the first common set of master data indicator indicates that the first data entity manages the plurality of instances of the two or more data entities which are linked to the first common entity relationship set by one or more of the plurality of common group unique keys;

using a computer processor to retrieve the first common set of master data indicator from the first repository of metadata;

using a computer processor to modify the plurality of instances of the two or more data entities which are linked to the first common entity relationship set based on the first common set of master data indicator;

wherein the first data entity includes a plurality of instances;

wherein the second data entity includes a plurality of instances;

wherein the plurality of instances for the first common entity relationship set includes the plurality of instances of the first data entity and the plurality of instances of the second data entity and the first data entity and the second data entity are members of the first common entity relationship set;

using a computer processor to configure the plurality of instances of the first common entity relationship set in the computer memory by using the first data attribute of the first data entity in a manner which ensures that each of the plurality of instances of the first common entity relationship set is uniquely identified in the computer memory by the first data attribute;

using the computer processor to ensure that each of the plurality of instances of the second data entity is one of the plurality of instances of the first data entity.]

[3. The method of claim 2 further comprising using a computer processor to add a first data model database to the first data entity-relationship diagram in the first repository of metadata;

using a computer processor to add a second data model database to the first data entity-relationship diagram in the first repository of metadata;

using a computer processor to add a first further plurality of data entities and a first further plurality of data entity relationships to the first data model database in the first data entity-relationship diagram in the first repository of metadata;

using a computer processor to add a second further plurality of data entities and a second further plurality of data entity relationships to the second data model database in the first data entity-relationship diagram in the first repository of metadata;

using a computer processor to database instantiate the first data model database and the second data model database as two different physical databases;

where the first data entity is a member of the first data model database and the second data entity is a member of the second data model database.]

[4. The method of claim 3 further comprising using a computer processor to store a second data entity-relationship diagram in the first repository of metadata;

wherein the second data entity-relationship diagram includes a third further plurality of data entities and a third further plurality of data entity relationships stored in a computer memory, such that each of the third further plurality of data entity relationships links one of the third further plurality of data entities with only one of the third further plurality of data entities;

wherein each of the third further plurality of data entities relates to one of a first further plurality of overall topics;

using a computer processor to store a third data model database in the first repository of metadata;

using a computer processor to add the third data model database to the second data entity-relationship diagram in the first repository of metadata;

using a computer processor to store a third data entity in the third data model database in the second data entity-relationship diagram;

where the third data entity relates to one of a second further plurality of overall topics;

where the third data entity includes a third data attribute relating to a sub topic of a third data entity overall topic of the second further plurality of overall topics;

the method further comprising using a computer processor to declare the third data attribute to be a third unique key for the third data entity by storing a third unique key indicator in the computer memory to indicate that the third data attribute is a third unique key;

using a computer processor to determine that the third data attribute is a third unique key and is a unique key for the third data entity, wherein the third data entity is comprised of a plurality of instances, and the third data attribute uniquely identifies each of the plurality of instances of the third data entity;

the method further comprises using the computer processor to add a third common entity relationship indicator to the computer memory to indicate that the third data attribute is a member of the first common entity relationship set in the first repository of metadata; and using a computer processor to store a common entity relationship link in the second entity-relationship diagram in the computer memory, wherein the common entity relationship link links the first data attribute of the first data entity, the second data attribute of the second data entity, the third data attribute of the third data entity;

wherein the common entity relationship link is a peer-to-peer type of link;

and wherein the first data entity-relationship diagram including the first data entity, the second data entity, the first data attribute and the second data attribute and the second entity-relationship diagram including the third data entity, the third data attribute are stored in the first repository of metadata prior to adding the first common entity relationship set as data to the first repository of metadata;

using a computer processor to retrieve the first common set of master data indicator from the first repository of metadata;

using a computer processor to modify the plurality of instances of the two or more data entities which are linked to the first common entity relationship set based on the first common set of master data indicator;

wherein the plurality of instances for the first common entity relationship set includes the plurality of instances of the first data entity, the plurality of instances of the second data entity, the plurality of the third data entity;

wherein the first data entity, the second data entity, the third data entity are members of the first common entity relationship set;

using a computer processor to configure the plurality of instances of the first common entity relationship set in the computer memory by using the first data attribute of the first data entity in a manner which ensures that each of the plurality of instances of the first common entity relationship set is uniquely identified in the computer memory by the first data attribute;

using the computer processor to ensure that each of the plurality of instances of the second data entity is one of the plurality of instances of the first data entity;

using the computer processor to ensure that each of the plurality of instances of the third data entity is one of the plurality of instances of the first data entity.]

[5. The method of claim 3 further comprising using a computer processor to add a third data attribute to the first data entity in the first repository of metadata;

wherein the third data attribute relates to a sub topic of the first data entity overall topic;

using a computer processor to add a fourth data attribute to the second data entity in the first repository of metadata;

where the fourth data attribute relates to a sub topic of the second data entity overall topic;

wherein the third data attribute and the fourth data attribute are the same.]

[6. The method of claim 3 further comprising using a computer processor to add a third data entity to the first data model database in the first repository of metadata;

using a computer processor to add a fourth data entity to the second data model database in the first repository of metadata;

using a computer processor to add a third data attribute and a fourth data attribute to the third data entity;

the method further comprising using a computer processor to declare the third data attribute and the fourth data attribute to be a first composite unique key for the third data entity by storing a third unique key indicator in the computer memory to indicate that the composite of the third data attribute and the fourth data attribute is a first composite unique key;

using a computer processor to add a fifth data attribute and a sixth data attribute to the fourth data entity;

the method further comprising using a computer processor to declare the fifth data attribute and the sixth data attribute to be a second composite unique key for the third data entity by storing a third unique key indicator in the computer memory to indicate that the composite of the fifth data attribute and the sixth data attribute is a second composite unique key;

using a computer processor to add a second common entity relationship set as data to the first repository of metadata; wherein the second common entity relationship set groups together a further plurality of common group unique keys wherein each of the further plurality of common group unique keys is the same as each of the other of the further plurality of common group unique keys, except that each of the further plurality of common group unique keys includes a data entity link stored in the computer memory which specifies a data entity of the plurality of data entities to which each of the further plurality of common group unique keys is related, such that each of the further plurality of common group unique keys is related to a different data entity of the plurality of data entities;

wherein the further plurality of common group keys includes the first composite unique key and the second composite unique key;

and the method further comprising using a computer processor to add a third common entity relationship indicator to computer memory to indicate that the first composite unique key is a member of the second common entity relationship set in the first repository of metadata; and using a computer processor to add a fourth common entity relationship indicator to the computer memory to indicate that the second composite unique key is a member of the second common entity relationship set in the first repository of metadata; and using a computer processor to store a common entity relationship link in the first data entity-relationship diagram in the computer memory, wherein the common entity relationship link links the first composite unique key of the third data entity and the second composite unique key of the fourth data entity, wherein the common entity relationship link is a peer-to-peer type of link;

wherein the computer processor adds the third data attribute and the fourth data attribute to the third data entity and declares the third data attribute and the fourth data attribute to be a first composite unique key for the third data entity prior to adding the second common entity relationship set as data to the first repository of metadata; and wherein the computer processor adds the fifth data attribute and the sixth data attribute to the fourth data entity and declares the fifth data attribute and the sixth data attribute to be a second composite unique key for the fourth data entity prior to adding the second common entity relationship set as data to the first repository of metadata.]

[7. The method of claim 6 further comprising using a computer processor to store a second common set of master data indicator in the first repository of metadata;

wherein the second common set of master data indicator indicates that the third data entity manages the plurality of instances of the two or more data entities which are linked to the second common entity relationship set by one or more of the plurality of common group unique keys;

using a computer processor to retrieve the second common set of master data indicator from the first repository of metadata;

using a computer processor to modify the plurality of instances of the two or more data entities which are linked to the second common entity relationship set based on the second common set of master data indicator;

wherein the third data entity includes a plurality of instances;

wherein the fourth data entity includes a plurality of instances;

wherein the plurality of instances for the second common entity relationship set includes the plurality of instances of the third data entity and the plurality of instances of the fourth data entity and the third data entity and the fourth data entity are members of the second common entity relationship set;

using a computer processor to configure the plurality of instances of the second common entity relationship set in the computer memory by using the first composite unique key of the third data entity in a manner which ensures that each of the plurality of instances of the second common entity relationship set is uniquely identified in the computer memory by the first composite unique key;

using the computer processor to ensure that each of the plurality of instances of the fourth data entity is one of the plurality of instances of the third data entity.]

[8. The method of claim 7 further comprising using a computer processor to add a seventh data attribute to the third data entity in the first repository of metadata;

wherein the seventh data attribute relates to a sub topic of a third data entity overall topic of the plurality of overall topics;

using a computer processor to add an eighth data attribute to the fourth data entity in the first repository of metadata;

where the eighth data attribute relates to a sub topic of a fourth data entity overall topic of the plurality of overall topics; and where the seventh data attribute and the eighth data attribute are the same.]

[9. A method comprising using a computer processor to store a first database in a computer memory;

wherein the first database includes a plurality of database tables and a plurality of database foreign key constraints, such that each of the plurality of database foreign key constraints links one of the plurality of database tables with only one of the plurality of database tables;

wherein each of the plurality of database tables relates to one of a plurality of overall topics;

wherein the first database includes a first database table of the plurality of database tables relating to a first database table overall topic of the plurality of overall topics;

wherein the first database table includes a first database table column relating to a sub topic of the first database table overall topic; and the method further comprising using a computer processor to database instantiate the first database table column with a first plurality of data values;

using a computer processor to use the first plurality of data values of the first database table column as a source of data values for a first unique index for the first database table;

using a computer processor to the enforce the first unique index of the first database table, where the first unique index is programmed to reject the storage in the first database table of any duplicate data values of the first plurality of data values;

wherein the first database table is comprised of a plurality of data records, and each data value of the first plurality of data values in the first database table column uniquely identifies each of the plurality of data records of the first database table;

wherein the first database includes a second database table of the plurality of database tables relating to a second database table overall topic of the plurality of overall topics;

wherein the second database table includes a second database table column relating to a sub topic of the second database table overall topic; and the method further comprising using a computer processor to database instantiate the second database table column with of a second plurality of data values;

using a computer processor to use the second plurality of data values of the second database column as a source of data values for a second unique index for the second database table;

using a computer processor to reject the storage in the second database table of any duplicate data values in the second plurality of data values, so that each of the second plurality of data values is different from each of the other of the second plurality of data values;

wherein the second database table is comprised of a plurality of data records, and each data value of the second plurality of data values in the second database table column uniquely identifies each of the plurality of data records in the second database table;

using the computer processor to ensure that each of the plurality of data records of the second database table is one of the plurality of data records of the first database table;

using the computer processor to ensure that each data record of the plurality of data records of the second database table may only be modified to match one of the data records of the plurality data records of the first database table; and using the computer processor to ensure that each data record of the plurality of data records from the first database table may not be changed if the same data record is in the plurality of data records of the second database table;

using the computer processor to ensure that each data record of the plurality of data records of the first database table cannot be deleted from the first database table if that same data record is in the plurality of data records of the second database table.]

[10. The method of claim 9 further comprising using a computer processor to add a third database table column to the first database table in the first database;

wherein the third database table column relates to a sub topic of the first database table overall topic;

using a computer processor to add a fourth database table column to the second database table in the first database;

where the fourth database column relates to a sub topic of the second database table overall topic;

where the third database table column and the fourth database table column include the same data attributes.]

[11. A method comprising using a computer processor to store a first database in a computer memory;

wherein the first database includes a plurality of database tables and a plurality of database foreign key constraints, such that each of the plurality of database foreign key constraints links one of the plurality of database tables with only one of the plurality of database tables;

wherein each of the plurality of database tables relates to one of a plurality of overall topics;

wherein the first database includes a first database table of the plurality of database tables relating to a first database table overall topic of the plurality of overall topics;

wherein the first database table includes a first database table column relating to a sub topic of the first database table overall topic; and the method further comprising using a computer processor to database instantiate the first database table column with a first plurality of data values;

using a computer processor to use the first plurality of data values of the first database table column as a source of data values for a first unique index for the first database table;

using a computer processor to reject the storage in the first database table of any duplicate data values in the first plurality of data values, so that each of the first plurality of data values is different from each of the other of the first plurality of data values;

wherein the first database table is comprised of a plurality of data records, and each data value of the first plurality of data values stored in the first database table column uniquely identifies each of the plurality of data records of the first database table;

using a computer processor to store a second database in a computer memory;

wherein the second database includes a further plurality of database tables and a further plurality of database foreign key constraints, such that each of the further plurality of database foreign key constraints links one of the further plurality of database tables with only one of the further plurality of database tables;

wherein each of the plurality of database tables relates to one of a further plurality of overall topics;

wherein the second database includes a second database table of the further plurality of database tables relating to a second database table overall topic of the further plurality of overall topics;

wherein the second database table includes a second database table column relating to a sub topic of the second database table overall topic; and the method further comprising using a computer processor to database instantiate the second database table column with a second plurality of data values;

using a computer processor to reject the storage in the second database table of any duplicate data values in the second plurality of data values, so that each of the second plurality of data values is different from each of the other of the second plurality of data values;

wherein the second database table is comprised of a plurality of data records, and each data value of the second plurality of data values stored in the second database table column uniquely identifies each of the plurality of data records of the second database table;

using the computer processor to ensure that each of the plurality of data records of the second database table stored in the second database is one of the plurality of data records of the first database table stored in the first database;

using the computer processor to ensure that each data record of the plurality of data records of the second database table stored in the second database may only be modified to match one of the data records of the plurality data records of the first database table stored in the first database; and using the computer processor to ensure that each data record of the plurality of data records from the first database table stored in the first database may not be changed if the same data record is in the plurality of data records of the second database table stored in the second database;

using the computer processor to ensure that each data record of the plurality of data records of the first database table stored in the first database cannot be deleted from the first database table if that same data record is in the plurality of data records of the second database table stored in the second database.]

[12. A method comprising using a computer processor to access a first repository of metadata in a computer memory;

using a computer processor to store a first data entity-relationship diagram in the first repository of metadata, wherein the first data entity-relationship diagram includes a first plurality of data entities and a first plurality of data entity relationships stored in the computer memory, such that each of the first plurality of data entity relationships links one of the first plurality of data entities with only one of the first plurality of data entities;

wherein each of the first plurality of data entities relates to one of a first plurality of overall topics;

wherein the first data entity-relationship diagram includes a first data entity of the first plurality of data entities relating to a first data entity overall topic of the first plurality of overall topics;

wherein the first data entity includes a first data attribute relating to a sub topic of the first data entity overall topic; and the method further comprising using a computer processor to declare the first data attribute to be a first unique key for the first data entity by storing a first unique key indicator in the computer memory to indicate that the first data attribute is a first unique key for the first data entity;

using a computer processor to determine that the first data attribute is a first unique key for the first data entity, wherein the first data entity is comprised of a first plurality of instances, and the first data attribute uniquely identifies each of the first plurality of instances of the first data entity;

using a computer processor to access a second repository of metadata in the computer memory;

using a computer processor to store a second data entity-relationship diagram in the second repository of metadata, wherein the second data entity-relationship diagram includes a second plurality of data entities and a second plurality of data entity relationships stored in the computer memory, such that each of the second plurality of data entity relationships links one of the second plurality of data entities with only one of the second plurality of data entities;

wherein each of the second plurality of data entities relates to one of a second plurality of overall topics;

wherein the second data entity-relationship diagram includes a second data entity of the second plurality of data entities relating to a second data entity overall topic of the second plurality of overall topics;

wherein the second data entity includes a second data attribute relating to a sub topic of the second data entity overall topic; and the method further comprising using a computer processor to declare the second data attribute to be a second unique key for the second data entity by storing a second unique key indicator in the computer memory to indicate that the second data attribute is a second unique key for the second data entity;

using a computer processor to determine that the second data attribute is a second unique key for the second data entity, wherein the second data entity is comprised of a second plurality of instances, and the second data attribute uniquely identifies each of the second plurality of instances of the second data entity;

using a computer processor to add a first common entity relationship set as data to the first repository of metadata and to the second repository of metadata;

wherein the first common entity relationship set groups together a plurality of common group unique keys wherein each of the plurality of common group unique keys is the same as each of the other of the plurality of common group unique keys, except that each of the plurality of common group unique keys includes a data entity link stored in the computer memory which specifies a data entity of the plurality of data entities to which each of the common group unique keys is related, such that each of the plurality of common group unique keys is related to a different data entity of the plurality of data entities;

wherein the plurality of common group keys includes the first data attribute of the first data entity of the first entity-relationship diagram;

wherein the plurality of common group keys includes the second data attribute of the second data entity of the second entity-relationship diagram;

and the method further comprising using a computer processor to add a first common entity relationship indicator to computer memory to indicate that the first data attribute is a member of the first common entity relationship set in the first repository of metadata; and using a computer processor to add a second common entity relationship indicator to the computer memory to indicate that the second data attribute is a member of the first common entity relationship set in the second repository of metadata; and using a computer processor to store a first common entity relationship link in the first data entity-relationship diagram in the computer memory, wherein the first common entity relationship link links the first data attribute of the first data entity to the first common entity relationship set;

using a computer processor to store a second common entity relationship link in the second data entity-relationship diagram in the computer memory, wherein the second common entity relationship link links the second data attribute of the second data entity to the first common entity relationship set.]

[13. The method of claim 12 further comprising using a computer processor to store a first database in a computer memory;

wherein the first database includes a first plurality of database tables database instantiated from the first plurality of data entities and a first plurality of database foreign key constraints database instantiated from the first plurality of data entity relationships, such that each of the first plurality of database foreign key constraints links one of the first plurality of database tables with only one of the first plurality of database tables;

wherein the first database includes a first database table of the first plurality of database tables database instantiated from the first data entity;

wherein the first database table includes a first database table column that is database instantiated from the first data attribute;

the method further comprising using a computer processor to database instantiate a first unique index from the first unique key of the first data entity for the first database table;

using a computer processor to determine that the first database table column of the first database table is the first unique index for the first database table, wherein the first database table is comprised of a first plurality of data records, and the first database table column uniquely identifies each of the first plurality of data records for the first database table;

using a computer processor to read metadata from the second repository of metadata;

using a computer processor to store a second database in a computer memory;

wherein the second database includes a second plurality of database tables database instantiated from the second plurality of data entities and a second plurality of database foreign key constraints database instantiated from the second plurality of data entity relationships, such that each of the second plurality of database foreign key constraints links one of the second plurality of database tables with only one of the second plurality of database tables;

wherein the second database includes a second database table of the second plurality of database tables database instantiated from the second data entity;

wherein the second database table includes a second database table column that is database instantiated from the second data attribute; and the method further comprising using a computer processor to database instantiate a second unique index from a second unique key of the second data entity for the second database table;

using a computer processor to determine that the second database table column of the second database table is the second unique index for the second database table, wherein the second database table is comprised of a second plurality of data records, and the second database table column uniquely identifies each of the second plurality of data records for the second database table;

using a computer processor to store a first computer program in a predefined location in the computer memory;

using a computer processor to store data referring to the predefined location in the first common entity relationship set in the first repository of metadata; and using a computer processor to store the predefined location in the first common entity relationship set in the second repository of metadata;

using a computer processor implementing the first computer program, to add a first plurality of data records to the first database table in the first database;

using a computer processor implementing the first computer program, to add a second plurality of data records to second database table in the second database;

wherein the first plurality of data records and the second plurality of data records are the same.]

[14. The method of claim 12 further comprising using a computer processor to add a first common set of master data indicator to the first common entity relationship set in the first repository of metadata and to the second repository of metadata;

wherein the first common set of master data indicator indicates that the first data entity of the first entity-relationship diagram is used by a computer processor to manage the plurality of instances of the two or more data entities which are linked to the first common entity relationship set by one or more of the plurality of common group unique keys;

using a computer processor to retrieve the first common set of master data indicator from the first repository of metadata;

using a computer processor to modify the plurality of instances of the two or more data entities which are linked to the first common entity relationship set based on the first common set of master data indicator;

wherein the first data entity includes a plurality of instances;

wherein the second data entity includes a plurality of instances;

wherein the plurality of instances for the first common entity relationship set includes the plurality of instances of the first data entity and the plurality of instances of the second data entity and the first data entity and the second data entity are members of the first common entity relationship set;

using a computer processor to configure the plurality of instances of the first common entity relationship set in the computer memory by using the first unique key of the first data entity in a manner which ensures that each of the plurality of instances of the first common entity relationship set is uniquely identified in the computer memory by the first unique key;

using the computer processor to ensure that each of the plurality of instances of the second data entity is one of the plurality of instances of the first data entity.]

[15. The method of claim 14 further comprising using a computer processor to store a first database in a computer memory;

wherein the first database includes a first plurality of database tables database instantiated from the first plurality of data entities and a first plurality of database foreign key constraints database instantiated from the first plurality of data entity relationships, such that each of the first plurality of database foreign key constraints links one of the first plurality of database tables with only one of the first plurality of database tables;

wherein the first database includes a first database table of the first plurality of database tables database instantiated from the first data entity;

wherein the first database table includes a first database table column that is database instantiated from the first data attribute;

the method further comprising using a computer processor to database instantiate a first unique index from the first unique key of the first data entity for the first database table;

using a computer processor to determine that the first database table column of the first database table is the first unique index for the first database table, wherein the first database table is comprised of a first plurality of data records, and the first database table column uniquely identifies each of the first plurality of data records for the first database table;

using a computer processor to read metadata from the second repository of metadata;

using a computer processor to store a second database in a computer memory;

wherein the second database includes a second plurality of database tables database instantiated from the second plurality of data entities and a second plurality of database foreign key constraints database instantiated from the second plurality of data entity relationships, such that each of the second plurality of database foreign key constraints links one of the second plurality of database tables with only one of the second plurality of database tables;

wherein the second database includes a second database table of the second plurality of database tables database instantiated from the second data entity;

wherein the second database table includes a second database table column that is database instantiated from the second data attribute; and the method further comprising using a computer processor to database instantiate a second unique index from a second unique key of the second data entity for the second database table;

using a computer processor to determine that the second database table column of the second database table is the second unique index for the second database table, wherein the second database table is comprised of a second plurality of data records, and the second database table column uniquely identifies each of the second plurality of data records for the second database table;

using the computer processor to ensure that each of the plurality of data records of the second database table is one of the plurality of data records of the first database table;

using the computer processor to ensure that each data record of the plurality of data records of the second database table may only be modified to match one of the data records of the plurality data records of the first database table; and using the computer processor to ensure that each data record of the plurality of data records from the first database table may not be changed if the same data record is in the plurality of data records of the second database table; and using the computer processor to ensure that each data record of the plurality of data records of the first database table cannot be deleted from the first database table if that same data record is in the plurality of data records of the second database table.]

*16. A computing system, comprising:*

*a computer processor;*

*a computer memory having stored within:*

*a first database table with a first unique index therein, wherein the first unique index in the first database table is a unique identifier for any data records in the first database table;*

*the first database table is a parent database table;*

*a second database table with the first unique index therein, wherein the first unique index in the second database table is a unique identifier for any data records in the second database table;*

*the second database table is a parent database table;*

*a first plurality of master data records stored in the first database table; and*

*wherein the computer memory has instructions stored therein for programming the computer processor to use the first plurality of master data records from the first database table as a source of master data records used to populate the second database table; and*

*wherein if any particular master data record of the first plurality of master data records in the first database table also exists in the second database table, then the computer processor is programmed to prevent the deletion of that particular master data record from the first database table.*

*17. The computing system of claim 16*

*wherein the first unique index of the first database table is a primary unique index of the first database table, wherein there is only one primary unique index in the first database table; and*

*wherein the first unique index of the second database table is a primary unique index of the second database table, wherein there is only one primary unique index in the second database table.*

*18. The computing system of claim 16*

*wherein the first database table resides in a first physical database that has been database instantiated within a database management system; and*

*wherein the second database table resides in a second physical database that has been database instantiated within a database management system.*

*19. The computing system of claim 18*

*wherein a first common index master constraint set is maintained between the first unique index of the first database table in the first physical database and the first unique index of the second database table in the second physical database.*

*20. The computing system of claim 18*

*wherein the first physical database is managed by a first database management system; and*

*wherein the second physical database is managed by a second database management system.*

*21. The computing system of claim 16*

*wherein the computer processor is programmed to add a third database table with the first unique index which serves as a unique index in the third database table;*

*wherein the third database table is a parent database table;*

*wherein the computer memory also has instructions stored therein for programming the computer processor to use the first plurality of master data records from the first database table as a source of master data records used to populate the third database table;*

*wherein if any particular master data record of the first plurality of master data records in the first database table also exists in the third database table, then the computer processor is programmed to prevent deletion of that particular master data record from the first database table.*

*22. The computing system of claim 21*

*wherein the first database table resides in a first database; and*

*wherein the second database table resides in a second database;*

*wherein the third database table resides in a third database; and*

*wherein a first common index master constraint set is maintained among the first unique index of the first database table in the first database and the first unique index of the second database table in the second database and the first unique index of the third database table in the third database.*

*23. A computing system comprising:*

*a computer processor;*

*a computer memory having stored within:*

*a first data model with a first entity-relationship diagram;*

*wherein the first entity-relationship diagram of the first data model contains a first data model database and a second data model database;*

*wherein the first data model database contains a first plurality of data entities and data entity relationships; and*

*wherein the second data model database contains a second plurality of data entities and data entity relationships;*

*wherein a first common data entity is included in the first plurality of data entities in the first data model database;*

*wherein a first copy of the first common data entity is included in the second plurality of data entities in the second data model database;*

*wherein the first common data entity contains a first unique key;*

*wherein the first copy of the first common data entity includes the first unique key; and*

*wherein the first unique key of the first common data entity is related by a first common entity relationship set to the first unique key of the first copy of the first common data entity.*

*24. The computing system of claim 23*

*wherein the first data model database is related to a first physical database; and*

*wherein the second data model database is related to a second physical database.*

*25. The computing system of claim 23*

*wherein a first common set of master data values is stored in computer memory; and*

*wherein the first common set of master data values is associated with the first common entity relationship set.*

*26. The computing system of claim 23*

*wherein the first entity-relationship diagram of the first data model contains a third data model database;*

*wherein the third data model database contains a third plurality of data entities and data entity relationships;*

*wherein a second copy of the first common data entity is included in the third plurality of data entities in the third data model database;*

*wherein the second copy of the first common data entity in the third plurality of data entities contains the first unique key;*

*wherein the first unique key of the second copy of the first common data entity of the third plurality of data entities in the third data model database is related by a first common entity relationship set to the first unique key of the first common data entity of the first plurality of data entities in the first data model database and to the first copy of the first common data entity of the second plurality of data entities in the second data model database.*

*27. The computing system of claim 26*

*wherein the first data model database is related to a first physical database;*

*wherein the second data model database is related to a second physical database; and*

*wherein the third data model database is related to a third physical database.*

*28. The computing system of claim 25*

*wherein a second common data entity is included in the first plurality of data entities in the first data model database;*

*wherein a copy of the second common data entity is included in the second plurality of data entities in the second data model database;*

*wherein the second common data entity in the first plurality of data entities contains a second unique key;*

*wherein the copy of the second common data entity in the second plurality of data entities contains the second unique key; and*

*wherein the second unique key of the second common data entity of the first plurality of data entities in the first data model database is related by a second common entity relationship set to the second unique key of the copy of the second common data entity of the second plurality of data entities in the second data model database.*

*29. The computing system of claim 28*

*wherein a second common set of master data values is stored in the computer memory; and*

*wherein the second common set of master data values is associated with the second common entity relationship set.*

*30. A computing system comprising:*

*a computer processor;*

*a computer memory having stored within:*

*a first data model with a first entity-relationship diagram;*

*wherein the first entity-relationship diagram of the first data model contains a first data entity; wherein the first data entity contains a first plurality of data attributes;*

*wherein a first data attribute from the first plurality of data attributes is a first unique key of the first data entity;*

*wherein the first unique key of the first data entity is related to a declared first common set of master data records; and*

*wherein the declared first common set of master data records is a designated source of data records for the first data entity, such that the declared first common set of master data records includes a plurality of data values and there are no duplicate data values among the plurality of data values of the declared first common set of master data records for the first unique key of the first data entity.*

*31. The computing system of claim 30*

*wherein a first common entity relationship set is defined within the computer memory by the computer processor; and*

*wherein a first common entity relationship of the first common entity relationship set is related to the first unique key of the first data entity within the computer memory by the computer processor.*

*32. The computing system of claim 31*

*wherein the first entity-relationship diagram of the first data model contains a second data entity;*

*wherein the second data entity contains the first plurality of data attributes;*

*wherein the first data attribute from the first plurality of data attributes is a first unique key of the second data entity; and*

*wherein a second common entity relationship of the first common entity relationship set is related to the first unique key of the second data entity within the computer memory by the computer processor.*

*33. The computing system of claim 32*

*wherein the first common entity relationship set includes a common entity master relationship;*

*wherein the computer processor is programmed by computer software stored in computer memory so that the common entity master relationship is the one and only common entity master relationship provided in the first common entity relationship set;*

*wherein the first common entity relationship of the first common entity relationship set is the common entity master relationship of the first common entity relationship set; and*

*wherein the first data entity related to the common entity master relationship of the first common entity relationship set is declared as a designated source of data records for the second data entity, and the computer processor is programmed so that only one designated source of data records is provided for the second data entity.*

*34. The computing system of claim 33*

*wherein the first data model with the first entity-relationship diagram includes a first and a second data model database;*

*wherein the first data entity is contained within the first data model database; and*

*wherein the second data entity is contained within the second data model database.*

*35. The computing system of claim 33*

*wherein a second data attribute from the first plurality of data attributes is a second unique key of the first data entity;*

*wherein a second data attribute from the first plurality of data attributes is a second unique key of the second data entity; and*

*wherein there are no duplicate data values among the plurality of data values of the declared first common set of master data records for the second unique key of the first data entity.*

*36. The computing system of claim 35*

*wherein a second common entity relationship set is defined within the computer memory by the computer processor; and*

*wherein a first common entity relationship of the second common entity relationship set is related to the second unique key of the first data entity within the computer memory by the computer processor;*

*wherein a second common entity relationship of the second common entity relationship set is related to the second unique key of the second data entity within the computer memory by the computer processor;*

*wherein the second common entity relationship set includes a common entity master relationship;*

*wherein the computer processor is programmed by computer software stored in computer memory so that the common entity master relationship of the second common entity relationship set is the one and only common entity master relationship provided in the second common entity relationship set;*

*wherein the first common entity relationship of the second common entity relationship set is the common entity master relationship of the second common entity relationship set; and*

*wherein the first data entity related to the common entity master relationship of the second common entity relationship set is declared as a designated source of data records for the second data entity, and the computer processor is programmed so that only one designated source of data records is provided for the second data entity.*

*37. The computing system of claim 36*

*wherein the first data model with the first entity-relationship diagram includes a first and a second data model database;*

*wherein the first data entity is contained within the first data model database; and*

*wherein the second data entity is contained within the second data model database.*

*38. The computing system of claim 33*

*wherein the first entity-relationship diagram of the first data model contains a third data entity;*

*wherein the third data entity contains the first plurality of data attributes;*

*wherein the first data attribute from the first plurality of data attributes is a first unique key of the third data entity; and*

*wherein a third common entity relationship of the first common entity relationship set is related to the first unique key of the third data entity within the computer memory by the computer processor; and*

*wherein the first data entity related to the common entity master relationship is declared as a designated source of data records for the third data entity, and the*

*computer processor is programmed so that only one designated source of data records is provided for the third data entity.*

*39. The computing system of claim 38*

*wherein the first data model with the first entity-relationship diagram includes a first, a second, and a third data model database;*

*wherein the first data entity is contained within the first data model database;*

*wherein the second data entity is contained within the second data model database; and*

*wherein the third data entity is contained within the third data model database.*

* * * * *